(12) United States Patent
Han et al.

(10) Patent No.: US 10,306,262 B2
(45) Date of Patent: *May 28, 2019

(54) VIDEO ENCODING METHOD AND VIDEO ENCODING APPARATUS AND VIDEO DECODING METHOD AND VIDEO DECODING APPARATUS, WHICH PERFORM DEBLOCKING FILTERING BASED ON TREE-STRUCTURE ENCODING UNITS

(71) Applicant: SAMSUNG ELECTRONICS CO., LTD., Suwon-si (KR)

(72) Inventors: Woo-jin Han, Suwon-si (KR); Elena Alshina, Suwon-si (KR); Jung-hye Min, Suwon-si (KR); Alexander Alshin, Suwon-si (KR); Il-koo Kim, Osan-si (KR); Nikolay Shlyakhov, Suwon-si (KR); Tammy Lee, Seoul (KR); Sun-il Lee, Yongin-si (KR); Min-su Cheon, Suwon-si (KR); Jianle Chen, Suwon-si (KR); Vadim Seregin, Suwon-si (KR); Yoon-mi Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/016,031

(22) Filed: Jun. 22, 2018

(65) Prior Publication Data

US 2018/0310015 A1 Oct. 25, 2018

Related U.S. Application Data

(63) Continuation of application No. 15/647,720, filed on Jul. 12, 2017, now Pat. No. 10,027,972, which is a
(Continued)

(51) Int. Cl.
*H04N 19/50* (2014.01)
*H04N 19/59* (2014.01)
(Continued)

(52) U.S. Cl.
CPC .......... *H04N 19/59* (2014.11); *H04N 19/117* (2014.11); *H04N 19/119* (2014.11);
(Continued)

(58) Field of Classification Search
CPC ........ H04N 19/50; H04N 19/80; H04N 19/82; H04N 19/117
See application file for complete search history.

(56) References Cited

U.S. PATENT DOCUMENTS 5,768,434 A 6/1998 Ran
6,028,634 A 2/2000 Yamaguchi et al.
(Continued)

FOREIGN PATENT DOCUMENTS

CA 2715211 A1 9/2009
CN 1523893 A 8/2004
(Continued)

OTHER PUBLICATIONS

Internet search for NPL; 2019 (Year: 2019).*
(Continued)

*Primary Examiner* — Luis Perez-Fuentes
(74) *Attorney, Agent, or Firm* — Sughrue Mion, PLLC

(57) ABSTRACT

A method of encoding a video is provided, the method includes: determining a filtering boundary on which deblocking filtering is to be performed based on at least one data unit from among a plurality of coding units that are hierarchically configured according to depths indicating a number of times at least one maximum coding unit is spatially spilt, and a plurality of prediction units and a plurality of transformation units respectively for prediction
(Continued)

and transformation of the plurality of coding units, determining filtering strength at the filtering boundary based on a prediction mode of a coding unit to which pixels adjacent to the filtering belong from among the plurality of coding units, and transformation coefficient values of the pixels adjacent to the filtering boundary, and performing deblocking filtering on the filtering boundary based on the determined filtering strength.

4 Claims, 20 Drawing Sheets

Related U.S. Application Data continuation of application No. 13/641,403, filed as application No. PCT/KR2011/002647 on Apr. 13, 2011, now Pat. No. 9,712,822.

(60) Provisional application No. 61/323,449, filed on Apr. 13, 2010.

(51) Int. Cl.
| | |
|---|---|
| *H04N 19/176* | (2014.01) |
| *H04N 19/196* | (2014.01) |
| *H04N 19/80* | (2014.01) |
| *H04N 19/119* | (2014.01) |
| *H04N 19/147* | (2014.01) |
| *H04N 19/61* | (2014.01) |
| *H04N 19/96* | (2014.01) |
| *H04N 19/513* | (2014.01) |
| *H04N 19/593* | (2014.01) |
| *H04N 19/44* | (2014.01) |
| *H04N 19/52* | (2014.01) |
| *H04N 19/172* | (2014.01) |
| *H04N 19/159* | (2014.01) |
| *H04N 19/139* | (2014.01) |
| *H04N 19/117* | (2014.01) |
| *H04N 19/82* | (2014.01) |
| *H04N 19/86* | (2014.01) |
| *H04N 19/30* | (2014.01) |
| *H04N 19/184* | (2014.01) |

(52) U.S. Cl.
CPC ......... *H04N 19/139* (2014.11); *H04N 19/147* (2014.11); *H04N 19/159* (2014.11); *H04N 19/172* (2014.11); *H04N 19/176* (2014.11); *H04N 19/197* (2014.11); *H04N 19/30* (2014.11); *H04N 19/44* (2014.11); *H04N 19/50* (2014.11); *H04N 19/513* (2014.11); *H04N 19/52* (2014.11); *H04N 19/593* (2014.11); *H04N 19/61* (2014.11); *H04N 19/80* (2014.11); *H04N 19/82* (2014.11); *H04N 19/86* (2014.11); *H04N 19/96* (2014.11); *H04N 19/184* (2014.11)

(56) References Cited

U.S. PATENT DOCUMENTS

| | | | |
|---|---|---|---|
| 6,240,135 B1 | 5/2001 | Kim | |
| 6,519,285 B2 | 2/2003 | Yamaguchi et al. | |
| 6,792,047 B1 | 9/2004 | Bixby et al. | |
| 7,050,504 B2* | 5/2006 | Joch | H04N 19/159 375/240.21 |
| 7,120,197 B2 | 10/2006 | Lin et al. | |
| 7,262,886 B2 | 8/2007 | Kim et al. | |
| 7,302,006 B2 | 11/2007 | Apostolopoulos et al. | |
| RE40,178 E | 3/2008 | Kim | |
| 7,352,812 B2 | 4/2008 | Sun et al. | |
| 7,460,042 B2 | 12/2008 | Oshikiri et al. | |
| 7,512,179 B2 | 3/2009 | Sanson et al. | |
| 7,613,241 B2 | 11/2009 | Hong | |
| 8,045,615 B2* | 10/2011 | Liang | H04N 19/61 375/240.03 |
| 8,045,821 B2 | 10/2011 | Tasaka | |
| 8,086,052 B2 | 12/2011 | Toth et al. | |
| 8,155,197 B2* | 4/2012 | Nakaishi | H04N 19/176 375/240.16 |
| 8,213,501 B2* | 7/2012 | Boon | H04N 19/46 348/403.1 |
| 8,345,777 B2* | 1/2013 | Lee | H04N 19/159 375/240.29 |
| 8,363,936 B2 | 1/2013 | Divorra Escoda et al. | |
| 8,457,198 B2 | 6/2013 | Baik | |
| 8,542,750 B2* | 9/2013 | Cha | H04N 19/61 375/240.12 |
| 8,605,784 B2 | 12/2013 | Min | |
| 8,611,416 B2 | 12/2013 | Hwang et al. | |
| 8,705,576 B2 | 4/2014 | Shim | |
| 8,718,139 B2 | 5/2014 | Yamada et al. | |
| 8,767,828 B2 | 7/2014 | Ma | |
| 8,792,561 B2* | 7/2014 | Min | H04N 19/139 375/240.24 |
| 9,077,989 B2* | 7/2015 | Sato | H04N 19/80 |
| 9,118,913 B2 | 8/2015 | Alshina et al. | |
| 9,172,968 B2 | 10/2015 | Karczewicz | |
| 9,215,461 B2 | 12/2015 | Kim et al. | |
| 9,351,000 B2 | 5/2016 | Lee | |
| 9,402,079 B2 | 7/2016 | Alshina et al. | |
| 9,609,334 B2 | 3/2017 | Lim et al. | |
| 9,712,822 B2* | 7/2017 | Han | H04N 19/50 |
| 2004/0081238 A1 | 4/2004 | Parhy | |
| 2004/0151247 A1 | 8/2004 | Sanson et al. | |
| 2005/0163217 A1 | 7/2005 | Shin et al. | |
| 2006/0013310 A1* | 1/2006 | Lee | H04N 19/159 375/240.16 |
| 2006/0146941 A1* | 7/2006 | Cha | H04N 19/61 375/240.29 |
| 2006/0193385 A1 | 8/2006 | Yin et al. | |
| 2006/0268985 A1 | 11/2006 | Liang et al. | |
| 2007/0025448 A1* | 2/2007 | Cha | H04N 19/159 375/240.24 |
| 2007/0171974 A1 | 7/2007 | Baik | |
| 2008/0117976 A1 | 5/2008 | Lu et al. | |
| 2008/0144722 A1* | 6/2008 | Park | H04N 19/00909 375/240.25 |
| 2008/0170629 A1 | 7/2008 | Shim et al. | |
| 2008/0193024 A1 | 8/2008 | Lee et al. | |
| 2008/0199090 A1 | 8/2008 | Tasaka et al. | |
| 2009/0003447 A1 | 1/2009 | Christoffersen et al. | |
| 2009/0196517 A1 | 8/2009 | Divorra Escoda et al. | |
| 2009/0207911 A1* | 8/2009 | Minamoto | H04N 19/139 375/240.03 |
| 2010/0086030 A1 | 4/2010 | Chen et al. | |
| 2010/0086032 A1 | 4/2010 | Chen et al. | |
| 2010/0091840 A1 | 4/2010 | Gao et al. | |
| 2010/0208827 A1* | 8/2010 | Divorra Escoda | H04N 19/61 375/240.24 |
| 2011/0051801 A1 | 3/2011 | Hwang et al. | |
| 2011/0170610 A1* | 7/2011 | Min | H04N 19/139 375/240.24 |
| 2011/0274166 A1* | 11/2011 | Jeon | G06T 9/00 375/240.12 |
| 2013/0077682 A1* | 3/2013 | Han | H04N 19/50 375/240.12 |
| 2013/0315299 A1 | 11/2013 | Kim et al. | |
| 2014/0003526 A1 | 1/2014 | Amon | |
| 2014/0294065 A1 | 10/2014 | Chen et al. | |
| 2015/0016525 A1 | 1/2015 | Alshina et al. | |
| 2016/0100163 A1* | 4/2016 | Rapaka | H04N 19/117 375/240.16 |

FOREIGN PATENT DOCUMENTS

| | | |
|---|---|---|
| CN | 1531824 A | 9/2004 |
| CN | 1812580 A | 8/2006 |
| CN | 1857001 A | 11/2006 |
| CN | 1910925 A | 2/2007 |

(56) References Cited

FOREIGN PATENT DOCUMENTS

| CN | 101009833 A | 8/2007 |
|---|---|---|
| CN | 101083769 A | 12/2007 |
| CN | 101127913 A | 2/2008 |
| CN | 101233756 A | 7/2008 |
| CN | 101472176 A | 7/2009 |
| CN | 101534443 A | 9/2009 |
| CN | 101543074 A | 9/2009 |
| CN | 101622878 A | 1/2010 |
| CN | 101926178 A | 12/2010 |
| EP | 1933566 A2 | 6/2008 |
| EP | 2485490 A2 | 8/2012 |
| EP | 2629528 B12 | 3/2015 |
| JP | 2003299100 A | 10/2003 |
| JP | 2006-303734 A | 11/2006 |
| JP | 2007202150 A | 8/2007 |
| JP | 2007-266861 A | 10/2007 |
| JP | 201 1-501 566 A | 1/2011 |
| JP | 2011-526770 A | 10/2011 |
| KR | 1999024963 A | 4/1999 |
| KR | 1020010081142 A | 8/2001 |
| KR | 1020030081403 A | 10/2003 |
| KR | 1020070027781 A | 3/2007 |
| KR | 100842558 B1 | 7/2008 |
| KR | 1020080066521 A | 7/2008 |
| KR | 10-2009-0057225 A | 6/2009 |
| KR | 1020090081672 A | 7/2009 |
| KR | 1020090097833 A | 9/2009 |
| KR | 10-2011-0017719 A | 2/2011 |
| KR | 10-2011-0036520 A | 4/2011 |
| RU | 2006128854 A | 3/2008 |
| RU | 2369039 C1 | 9/2009 |
| RU | 2384971 C1 | 3/2010 |
| WO | 2004104930 A2 | 12/2004 |
| WO | 2009051719 A2 | 4/2009 |
| WO | 2009/093879 A2 | 7/2009 |
| WO | 2009/094036 A1 | 7/2009 |
| WO | 2010/002214 A2 | 1/2010 |
| WO | 2010039728 A3 | 4/2010 |
| WO | 2010095915 A3 | 8/2010 |
| WO | 2011019250 A2 | 2/2011 |
| WO | 2011/040795 A2 | 4/2011 |
| WO | 2011087297 A2 | 7/2011 |

OTHER PUBLICATIONS

HEVC Deblocking Filter; Oct. 2012 (Year: 2012).*
HEVC Complexity and Implementation Analysis; Dec. 2012; Bossen (Year: 2012).*
Implemented architecture of deblocking filter for H264-AVC; Sheng—2004 (Year: 2004).*
Office Action dated Mar. 20, 2018, issued by the Russian Patent Office in counterpart Russian application No. 2017102891.
Search Report dated Mar. 20, 2018, issued by the Russian Patent Office in counterpart Russian application No. 2017102891.
Communication dated Apr. 2, 2018, issued by the State Intellectual Property Office of P.R. China in counterpart Chinese application No. 201610304709.X.
Communication dated Apr. 24, 2018, issued by the State Intellectual Property Office of P.R. China in counterpart Chinese application No. 201610304585.5.
Communication dated May 3, 2018, issued by the State Intellectual Property Office of P.R. China in counterpart Chinese application No. 201610305455.3.
Written Opinion dated Dec. 20, 2011 issued in International Application No. PCT/KR2011/002647 (PCT/ISA/210).
Rejection of amendment dated Apr. 26, 2016, issued by the Japanese Patent Office in counterpart Japanese Patent Application No. 2013-504826.
International Search Report dated Dec. 26, 2011 issued in International Application No. PCT/KR2011/002649 (PCT/ISA/210).
Communication from the State Intellectual Property Office of P.R. China dated Jan. 27, 2015 in counterpart Chinese application No. 2011180028147.6.

ITU-T Recommendation H.264 (Mar. 2005), "Advanced video coding for generic audiovisual services", [Online], Mar. 2005, ITU-T, total 21 pages.
Wiegand, T., et al., "WD3: Working Draft 3 of High-Efficiency Video Coding", [Online], Apr. 6, 2011, Collaborative Team on Video Coding (JCT-VC) of ITU-T SG16 WP3 and ISO/IEC JTC1/SC29/WG11, Document: JCTVC-E603, (Version 2), total 24 pages.
Communication from the Australian Patent Office dated Jan. 21, 2015 in a counterpart Australian Application No. 2011241284.
Communication from the Japanese Patent Office dated Feb. 17, 2015 in a counterpart Japanese application No. 2013-504826.
Communication from the State Intellectual Property Office of P.R. China dated Mar. 26, 2015 in a counterpart application No. 201180029233.9.
Communication from the Japanese Patent Office dated Feb. 10, 2015 in a counterpart Japanese application No. 2013-504827.
Communication from the Australian Patent Office dated Oct. 14, 2014, in a counterpart Australian Application No. 2011241283.
Communication from the Canadian Patent Office dated Oct. 29, 2014, in a counterpart Canadian Application No. 2796203.
Communication from the Canadian Patent Office dated Nov. 4, 2014, in a counterpart Canadian Application No. 2796364.
Communication from the State Intellectual Property Office of P.R. China dated Dec. 31, 2014, in a counterpart application No. 201180029083.1.
International Search Report dated Dec. 21, 2011 issued in International Application No. PCT/KR2011/002648 (PCT/ISA/210).
Communication dated Sep. 12, 2013, issued by the Australian Patent Office in counterpart Australian Application No. 2011241283.
Communication dated Oct. 4, 2013, issued by the Australian Patent Office in counterpart Australian Application No. 2011241282.
"Digital broadcast textbook in IPTV era", Apr. 1, 2010, 12 pages total, ISBN: 978-4-8443-2853-7, Impress R&D.
"Performance improvement of H.264 software decoder", Mar. 7, 2006, 10 pages total, Information Process Society.
"Image encoding of One Seg, broadcast technology", Jun. 1, 2008, 10 pages total, vol. 61 No. 6, ISSN: 0287-8658.
"Impress standard textbook series, revision 3, H.264/AVC textbook", Jan. 1, 2009, 14 pages total, first edition, ISBNL 978-4-8443-2664-9.
"Ubiquitous technology, high efficiency of moving pictures—MPEG-4 and H.264", Apr. 20, 2005, 8 pages total, first edition, Ohm Co., Ltd., ISBN: 4-274-20060-4.
"Verification of effects of asymmetric macro block division and mounting method in H.26L", Nov. 15, 2002, 11 pages total, vol. 2002 No. 106, Search Report of Information Process Society.
Tambankar A et al., "An overview of H.264/MPEG-4 part 10", Video/Image Processing and Multimedia Communications, Jul. 2-5, 2003, 51 pages of total, vol. 1, IEEE, Zagreb, Croatia, XP010650106.
Communication dated Aug. 21, 2015 issued by Korean Intellectual Property Office in counterpart Korean Application No. 10-2011-0034413.
Communication dated Sep. 14, 2015 issued by Australian Intellectual Property Office in counterpart Australian Patent Application No. 2015200779.
Communication dated Sep. 15, 2015 issued by Japanese Intellectual Property Office in counterpart Japanese Patent Application No. 2013-504826.
Communication dated Jul. 21, 2015 issued by European Patent Office in European Application No. 11 769 087.5.
Communication from the Korean Intellectual Property Office dated Oct. 20, 2015 in a counterpart Korean application No. 10-2011-0034461.
Communication from the Korean Intellectual Property Office dated Dec. 18, 2015 in a counterpart Korean application No. 10-2014-0148758.
Communication from the Japanese Patent Office dated Oct. 6, 2015 in a counterpart Japanese application No. 2013-504828.
Communication from the Japanese Patent Office dated May 23, 2017 in a counterpart Japanese application No. 2013-504828.
Communication from the Korean Intellectual Property Office dated Dec. 18, 2015 in a counterpart Korean application No. 10-2011-0034413.

(56) References Cited

OTHER PUBLICATIONS

Communication from the Korean Intellectual Property Office dated Dec. 18, 2015 in a counterpart Korean application No. 10-2011-3441 4.
Communication dated Jan. 25, 2016, issued by the Canadian Intellectual Property Office in counterpart Canadian Application No. 2,796,364.
Communication dated Mar. 31, 2016, issued by the Korean Intellectual Property Office in counterpart Korean Application No. 10-2016-0024714.
Communication dated Jan. 13, 2016, issued by the Korean Intellectual Property Office in counterpart Korean Application No. 10-2011-0034461.
Communication dated Feb. 24, 2015 by the Ministry of Justice and Human Rights of the Republic of Indonesia Directorate General of Intellectual Property Rights in related Application No. W00201204687.
Communication dated Sep. 2, 2016, issued by the Korean Intellectual Property Office in counterpart Korean Application No. 10-2016-0024714.
Communication dated Oct. 25, 2016, issued by the Russian Intellectual Property Office in counterpart Russian Application No. 2014127502/08.
Communication, dated Apr. 25, 2014, issued by the Russian Patent Office in counterpart Russian Application No. 2012148138/08(077281).
Communication, dated Jun. 4, 2014, issued by the European Patent Office in counterpart European Application No. 11769085.9.
McCann, Ken et al., "Samsung's Response to the Call for Proposals on Video Compression Technology," Joint Collaborative Team on Video Coding (JCT-VC) of ITU-T SG16 WP3 and ISO/IEC JTC1/SC29/WG11, 1st Meeting, Dresden, DE; Apr. 15-23, 2010, pp. 1-40.
Naito, S. et al., "Efficient coding scheme for super high definition video based on extending H.264 high profile," Proceedings of SPIE, SPIE—International Society for Optical Engineering, vol. 6077, No. 67727, Jan. 18, 2006, pp. 1-8.
Puri, Atul et al., "Video coding using the H.264/MPEG-4 AVC compression standard," Signal Processing: Image Communication, Elsevier Science Publishers, Amsterdam, NL, vol. 19, No. 9, Oct. 1, 2004, pp. 793-849.
Communication, dated Jun. 27, 2014, issued by the Mexican Patent Office in counterpart Mexican Application No. MX/a/2012/012017.
Communication, dated Jun. 4, 2014, issued by the European Patent Office in counterpart European Application No. 11769086.7.
Han, Woo-Jin et al., "Improved Video Compression Efficiency Through Flexible Unite Representation and Corresponding Extension of Coding Tools," IEEE Transactions on Circuits and Systems for Video Technology, vol. 20, No. 12, Dec. 2010, pp. 1709-1720.
Communication, dated Jun. 4, 2014, issued by the European Patent Office in counterpart European Application No. 11769087.5.
Communication dated Sep. 15, 2016, issued by the European Patent Office in counterpart European Application No. 11769087.5.
Communication dated Sep. 29, 2016, issued by the Russian Intellectual Property Office in counterpart Russion Application No. 2014128147/08.
Communication, dated Dec. 9, 2013, issued by the Russian Patent Office in counterpart Russian Application No. 2012148127/08(077270).
Communication, dated Mar. 14, 2017, issued by the Japanese Patent Office in counterpart Japanese Application No. 2016-021347.
Shun-ichi Sekiguchi et al.: "Low-overheard INTER Prediction Modes", ITU-Telecommunications Standardization Sector, Study Group 16, Video Coding Experts Group (VCEG), 14th Meeting, Santa Barbara, CA, USA, Sep. 24-27, 2001, Doc: VCEG-N45, pp. 1-6, (7 pages total).
Kem McCann et al.: "JCT-VC AHG Report: HEVC Draft and Test Model editing", Joint Collaborative Team on Video Coding (JCT-VC) of ITU-T SG16 WP3 and ISO/IEC JTC1/SC29/WG11, 5th Meeting: Geneva, CH, Mar. 16-23, 2011, Doc: JCTVC-E002, pp. 1-4, (5 pages total).

Final Rejection dated Apr. 26, 2016, issued by the Japanese Patent Office in counterpart Japanese Patent Application No. 2013-504826.
Communication dated Jun. 8, 2016, issued by the Korean Intellectual Property Office in counterpart Korean Patent Application No. 10-2014-0148759.
Communication dated May 23, 2017, issued by the Japanese Patent Office in counterpart Japanese Patent Application No. 2016-21347.
International Search Report dated Dec. 20, 2011 issued in International Application No. PCT/KR2011/002647 (PCT/ISA/210).
Efficient coding scheme for super high definition video based on H264 high profile; Nanito (2005).
Samsung's Response to the Call for Proposal on Video Compression Technology; Ken (Apr. 2010).
Working Draft 3 of High Efficiency Video coding; Wiegan (Mar. 2011).
Non-Final Office Action dated Aug. 13, 2015 in U.S. Appl. No. 13/641,403.
Final Office Action dated Feb. 26, 2016 in U.S. Appl. No. 13/641,403.
Non-Final Office Action dated Aug. 26, 2016 in U.S. Appl. No. 13/641,403.
Notice of Allowance dated Mar. 6, 2017 in U.S. Appl. No. 13/641,403.
Communication dated Nov. 27, 2017, issued by Korean Intellectual Property Office in counterpart Korean Application No. 10-2016-0128554.
Communication dated Nov. 29, 2017, issued by the Australian Patent Office in counterpart Australian Application No. 2017200713.
Communication dated Dec. 4, 2017, issued by the Directorate of General Intellectual Property Rights in counterpart Indonesian Patent Application No. W00201204688.
Communication dated Dec. 8, 2017, issued by the Indian Patent Office in counterpart Indian Patent Application No. 9528/CHENP/2012.
Communication dated Dec. 12, 2017, issued by the Japanese Patent Office in counterpart Japanese Patent Application No. 2016-236858.
Communication dated Dec. 28, 2017, issued by the Indian Patent Office in counterpart Indian Patent Application No. 9497/CHENP/2012.
Communication dated Jan. 16, 2018, from the Japanese Patent Office in counterpart application No. 2013-504826.
Kim, et al., "Enlarging MB950am size for high fidelity video coding beyond HD", Oct. 2008, ITU—Telecommunications Standardization Sector, Study Group 16 Question 6, Video Coding Experts Group (VCEG), VCEG-AJ21, pp. 1-6.
Morvan, et al., "Novel Coding Technique for Depth Images using Quadtree Decomposition and Plane Approximation", 2005, Visual Communications and Image Processing, SPIE International Society for Optical engineering, vol. 5960, Issue No. 3, pp. 1-8.
Sjöberg, R. "TMuC text on max Cu size seems broken", Oct. 2010, Joint Collaborative Team on Video Coding (JCT-VC) of ITU-T SG16 WP3 and ISO/IEC JTC1 /SC29/WG11, JCTVC-C318, 5 pages total.
Anonymous, "Test Model under Consideration", Jul. 2010, Joint Collaborative Team on Video Coding (JCT-VC) of ITU-T SG16 WP3 and ISO/IEC JTC1/SC29/WG11, JCTVC-B205, 13 pages total.
Schwarz, Heiko, et al., "Errata report and drafting update for ITU-T Rec. H.264 ISO/IEC 14496-10," Joint Video Team (JVT) of ISO/IEC MPEG & ITU-T VCEG (ISO/IEC JTC1/SC29/WG11 and ITU-T SG16 Q.6), 32nd Joint Video Team Meeting, Geneva, Nov. 2-4, 2009, pp. 1-86.
Communication dated Jun. 16, 2017, issued by European Patent Office in counterpart European Patent Application No. 17155086.6.
Communication dated Jun. 30, 2017, issued by the Korean Intellectual Property Office in counterpart Korean Application No. 10-2017-0066395.
Simplified H264-AVC deblocking filter for SVC enhanced layer; He; Apr. 2007.
Reducing SVC coding complexity by disabling chroma deblocking filter; He; Oct. 2006.
Spatial Scalability within the H264-AVC Scalable video coding extension; Segall; Set-2007.
Google search for NPL log.

(56) References Cited

OTHER PUBLICATIONS

Communication dated Jul. 23, 2018, issued by the State Intellectual Property Office of P.R. China in counterpart Chinese Application No. 201610835651.1.
Communication dated Jul. 23, 2018, issued by the State Intellectual Property Office of P.R. China in counterpart Chinese Application No. 201610835685.0.
Communication dated Jul. 27, 2018, issued by the State Intellectual Property Office of P.R. China in counterpart Chinese Application No. 201610833768.6.
Communication dated Aug. 3, 2018, issued by the State Intellectual Property Office of P.R. China in counterpart Chinese Application No. 201610833779.4.
Communication dated Dec. 17, 2018, issued by the State Intellectual Property Office of P.R. China in counterpart Chinese Application No. 201710111120.2.

* cited by examiner

CODING UNIT (1010)

— FILTERING BOUNDARY

— FILTERING BOUNDARY

FIG. 20A

| indexA (for α) or indexB (for β) | | | | | | | | | | | | | | | | | | | | | | | | | |
|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| α | 0 | 0 | 0 | 0 | 0 | 0 | 0 | 0 | 0 | 0 | 0 | 0 | 0 | 0 | 0 | 0 | 0 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 4 | 4 | 4 | 4 |

FIG. 20B

| indexA (for α) or indexB (for β) | | | | | | | | | | | | | | | | | | | | | | | | | |
|---|---|---|---|---|---|---|---|---|---|---|---|---|---|---|---|---|---|---|---|---|---|---|---|---|---|
| 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

FIG. 22A

| indexA | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| bS=1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| bS=2 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |
| bS=3 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |

FIG. 22B

| indexA | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| bS=1 | 1 | 1 | 1 | 1 | 1 | 1 | 1 | 2 | 2 | 2 | 2 | 3 | 3 | 3 | 4 | 4 | 4 | 5 | 6 | 6 | 7 | 8 | 9 | 10 | 11 | 13 |
| bS=2 | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| bS=3 | 2 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

VIDEO ENCODING METHOD AND VIDEO ENCODING APPARATUS AND VIDEO DECODING METHOD AND VIDEO DECODING APPARATUS, WHICH PERFORM DEBLOCKING FILTERING BASED ON TREE-STRUCTURE ENCODING UNITS

CROSS-REFERENCE TO RELATED APPLICATIONS

This application is a Continuation of U.S. patent application Ser. No. 15/647,720 filed Jul. 12, 2017, which is a Continuation of U.S. patent application Ser. No. 13/641,403 filed Dec. 11, 2012, and issued as U.S. Pat. No. 9,712,822, which is a National Stage application under 35 U.S.C. § 371 of PCT/KR2011/002647 filed on Apr. 13, 2011, which claims priority from U.S. Provisional Application No. 61/323,449, filed on Apr. 13, 2010 in the United States Patent and Trademark Office, the disclosures of which are incorporated herein by reference in their entirety.

BACKGROUND

1. Field

The exemplary embodiments relate to encoding and decoding a video.

2. Description of Related Art

As hardware for reproducing and storing high resolution or high quality video content is being developed and supplied, a need for a video codec for effectively encoding or decoding the high resolution or high quality video content is increasing. In a related art video codec, a video is encoded according to a limited encoding method based on a macroblock having a predetermined size.

A prediction encoding method based on a macroblock may generate a blocking effect due to discontinuous pixel values at boundaries of blocks. Accordingly, in a video codec, deblocking filtering is performed to improve video compressibility and quality of a restored image.

SUMMARY

Aspects of one or more exemplary embodiments provide a method of performing deblocking filtering in a video codec by using a coding unit overcoming limits of a related art macroblock-based encoding method.

Aspects of one or more exemplary embodiments also provide a method and apparatus for performing deblocking filtering, which reduce a deblocking effect generated in a boundary region of coding units in a video encoded based on a tree-structured coding unit.

According to an aspect of an exemplary embodiment, there is provided a method of encoding a video, which performs deblocking filtering based on coding units, the method including: splitting one picture into at least one maximum coding unit that is a data unit having a maximum size; determining a plurality of coding units that are hierarchically configured according to depths indicating a number of times the at least one maximum coding unit is spatially spilt, and a plurality of prediction units and a plurality of transformation units respectively for prediction and transformation of the coding units; determining a filtering boundary on which deblocking filtering is to be performed based on at least one data unit from among the plurality of coding units, plurality of prediction units, and the plurality of transformation units; determining filtering strength at the filtering boundary based on a prediction mode of a coding unit to which pixels adjacent to the filtering boundary belong from among the plurality of coding units, and transformation coefficient values of the pixels adjacent to the filtering boundary; and performing deblocking filtering on the filtering boundary based on the determined filtering strength.

According to an aspect of another exemplary embodiment, there is provided a method of decoding a video, which performs deblocking filtering based on coding units, the method including: extracting image data encoded according to a plurality of coding units, encoding mode information about the plurality of coding units encoded according to a tree structure, and information about deblocking filtering in a maximum coding unit, according to the coding units encoded according to the tree structure included in each maximum coding unit obtained by splitting a picture, by parsing a received bitstream; determining a plurality of prediction units and a plurality of transformation units for prediction and transformation according to the plurality of coding units and decoding the encoded image data, based on the encoding mode information about the a plurality of coding units encoded according to the tree structure; determining a filtering boundary to which deblocking filtering is to be performed from among boundaries of at least one data unit from among the plurality of coding units encoded according to the tree structure, the plurality of prediction units, and the plurality of transformation units, by using the information about the deblocking filtering; determining filtering strength of the filtering boundary based on a prediction mode of a coding unit to which adjacent pixels to the determined filtering boundary belong from among the plurality of coding units and transformation coefficient values of pixels adjacent to the filtering boundary; and performing deblocking filtering on the decoded image data based on the determined filtering strength.

According to an aspect of another exemplary embodiment, there is provided an apparatus for encoding a video, which performs deblocking filtering based on coding units, the apparatus including: a coding unit determiner for determining a plurality of coding units that are hierarchically configured according to depths indicating a number of times at least one maximum coding unit is spatially split, wherein the maximum coding unit is a data unit having a maximum size that is spilt to encode one picture, and a plurality of prediction units and a plurality of transformation units respectively for prediction and transformation of the plurality of coding units; a deblocking filtering unit for determining a filtering boundary on which deblocking filtering is to be performed based on at least one data unit from among the plurality of coding units, the plurality of prediction units, and the plurality of transformation units, determining filtering strength at the filtering boundary based on a prediction mode of a coding unit to which pixels adjacent to the filtering boundary belong from among the plurality of coding units, and transformation coefficient values of the pixels adjacent to the filtering boundary, and performing deblocking filtering on the filtering boundary based on the determined filtering strength; and a transmitter for encoding information about the deblocking filtering and transmitting the information with encoding data of the one picture and encoding mode information about the coding units according to the tree structure.

According to an aspect of another exemplary embodiment, there is provided an apparatus for decoding a video, which performs deblocking filtering based on coding units, the apparatus including: receiving and extracting unit for extracting image data encoded according to a plurality of coding units, encoding mode information about the plurality of coding units encoded according to a tree structure, and information about deblocking filtering in a maximum coding unit, according to the coding units encoded according to the tree structure included in each maximum coding unit obtained by splitting a current picture, by parsing a received bitstream; a decoder for determining a plurality of prediction units and a plurality of transformation units for prediction and transformation according to the plurality of coding units and decoding the encoded image data, based on the encoding mode information about the plurality of coding units encoded according to the tree structure; and a deblocking filtering unit for determining a filtering boundary to which deblocking filtering is to be performed from among boundaries of at least one data unit from among the plurality of coding units encoded according to the tree structure, the plurality of prediction units, and the plurality of transformation units, by using the information about the deblocking filtering, determining filtering strength of the filtering boundary based on a prediction mode of a coding unit to which pixels adjacent to the determined filtering boundary belong from among the plurality of coding units and transformation coefficient values of pixels adjacent to the filtering boundary, and performing deblocking filtering on the decoded image data based on the determined filtering strength.

According to aspects of one or more exemplary embodiments, an, the quality of a compressed and restored video may be remarkably improved by removing a deblocking effect from the compressed and restored video based on a tree-structured coding unit.

BRIEF DESCRIPTION OF THE DRAWINGS

The above and other features and advantages will become more apparent by describing in detail exemplary embodiments with reference to the attached drawings in which:

FIGS. 20A and 20B are reference tables for determining threshold values $\alpha$ and $\beta$, according to an exemplary embodiment;

FIGS. 22A and 22B are reference tables used to determine a predetermined intermediate value used during a deblocking filtering process, according to an exemplary embodiment;

DETAILED DESCRIPTION OF EXEMPLARY EMBODIMENTS

Figure 1:
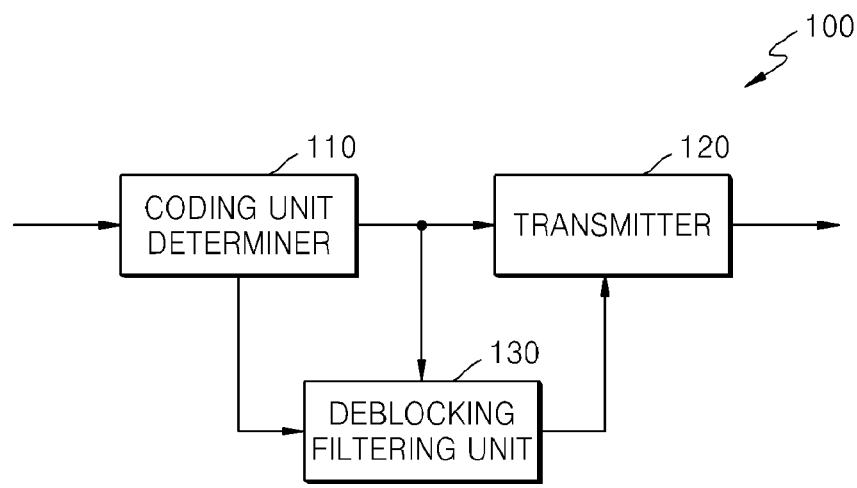
FIG. 1 is a block diagram of an apparatus for encoding a video, which performs deblocking filtering based on coding units according to a tree structure, according to an exemplary embodiment.

Hereinafter, exemplary embodiments will be described more fully with reference to the accompanying drawings, in which like reference numerals correspond to like elements throughout.

FIG. 1 is a block diagram of a video encoding apparatus 100 which perform deblocking filtering based on coding units according to a tree structure, according to an exemplary embodiment.

The video encoding apparatus 100 includes a coding unit determiner 110, a deblocking filtering unit 130, and a transmitter 120.

The coding unit determiner 110 receives image data of one picture of a video and splits the picture into at least one maximum coding unit that is a data unit having a maximum size. The maximum coding unit according to an exemplary embodiment may be a data unit having a size of 32×32, 64×64, 128×128, 256×256, etc., wherein a shape of the data unit is a square having a width and length in squares of 2 that is higher than 8.

The coding unit determiner 110 determines coding units having a hierarchical structure according to regions spatially spilt per maximum coding unit. The coding units may be expressed based on a depth indicating a number of times the maximum coding unit is spatially split. In detail, coding units according to a tree structure include coding units corresponding to a depth determined to be a coded depth, from among all deeper coding units according to depths included in the maximum coding unit. A coding unit of a coded depth may be hierarchically determined according to depths in the same region of the maximum coding unit, and may be independently determined in different regions.

The coding unit determiner 110 may encode each deeper coding unit included in a current maximum coding unit, and determine a coding unit for outputting an optimum encoding result and a coded depth that is a corresponding depth by comparing encoding results of coding units of an upper depth and a lower depth according to regions. Also, a coded depth of a current region may be independently determined from a coded depth of another region.

Accordingly, the coding unit determiner 110 may determine coding units according to a tree structure in a coded depth independently determined according to regions per maximum coding unit. Also, the coding unit determiner 110 performs prediction encoding while determining the coding units of the coded depth. The coding unit determiner 110 may determine a prediction unit or a partition that is a data unit for performing prediction encoding to output an optimum encoding result in the coding unit of the coded depth. For example, examples of a partition type with respect to a coding unit having a size of 2N×2N (where N is a positive integer) may include partitions having sizes 2N×2N, 2N×N, N×2N, or N×N. Examples of the partition type include symmetrical partitions that are obtained by symmetrically splitting a height or width of the coding unit, partitions obtained by asymmetrically splitting the height or width of the coding unit, such as 1:n or n:1, partitions that are obtained by geometrically splitting the prediction unit, and partitions having arbitrary shapes. Also, a prediction mode of the partition type may be an inter mode, an intra mode, a skip mode, or the like.

A coding unit according to an exemplary embodiment may be characterized by a maximum size and a depth. The depth denotes a number of times the coding unit is hierarchically split from the maximum coding unit, and as the depth increases, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit increases, a coding unit corresponding to an upper depth may include a plurality of coding units corresponding to lower depths.

A maximum depth according to an exemplary embodiment is an index related to the number of splitting times from a maximum coding unit to a minimum coding unit or the number of times a maximum coding unit is split to arrive at the minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Coding units according to a tree structure in a maximum coding unit and a method of determining a partition, according to aspects of exemplary embodiments, will be described in detail later with reference to FIGS. 3 through 12.

The deblocking filtering unit 130 determines a filtering boundary to which deblocking filtering is to be performed based on at least one data unit from among coding units, prediction units, and transformation units, and determines filtering strength in the filtering boundary based on a prediction mode of a coding unit to which adjacent pixels belong based on the determined filtering boundary and transformation coefficient values of pixels adjacent to the filtering boundary, and performs deblocking filtering based on the filtering strength. For example, when the coding units, prediction units, and transformation units are determined as will be described below, the deblocking filtering unit 130 may determine a boundary of data units having a predetermined size or above as the filtering boundary to which the deblocking filtering is to be performed based on sizes of the coding units, prediction units, and transformation units, and perform the deblocking filtering on the pixels adjacent to the filtering boundary.

The transmitter 120 may encode information about the deblocking filtering determined by the deblocking filtering unit 130, and transmit the information along with encoded data of the picture and encoding mode information about the coding units according to the tree structure of the maximum coding unit. The information about the deblocking filtering may include filtering boundary determination information, such as a size of a data unit for determining a data unit for performing the deblocking filtering, from among boundaries of data units, such as the coding units, the prediction units, and the transformation units.

The transmitter 120 may insert and transmit the information about the deblocking filtering into a sequence parameter set (SPS) or a picture parameter set (PPS) of the picture.

A process of determining a filtering boundary for deblocking filtering and a deblocking filtering process according to aspects of exemplary embodiments will be described in detail later with reference to FIGS. 14 through 24.

The coding unit determiner 110 may determine a coding unit having an optimum shape and size per maximum coding unit, based on a size and maximum depth of a maximum coding unit determined considering characteristics of a current picture. Also, since encoding may be performed by using any one of various prediction modes and transformation methods per maximum coding unit, an optimum encoding mode may be determined considering image characteristics of coding units of various image sizes.

If an image having high resolution or large data amount is encoded in a macroblock unit having a fixed size of 16×16 or 8×8, a number of macroblocks per picture excessively increases. Accordingly, a number of pieces of compressed information generated for each macroblock increases, and thus it is difficult to transmit the compressed information and data compression efficiency decreases. However, by using the coding unit determiner 110, final compression efficiency of a video may be increased since a coding unit is adjusted while considering characteristics of an image and increasing a maximum size of a coding unit while considering a size of the image.

Also, prediction encoding having a reduced error with an original picture may be performed by using a reference picture that is deblocking filtered, via deblocking filtering based on coding units according to a tree structure.

Figure 2:
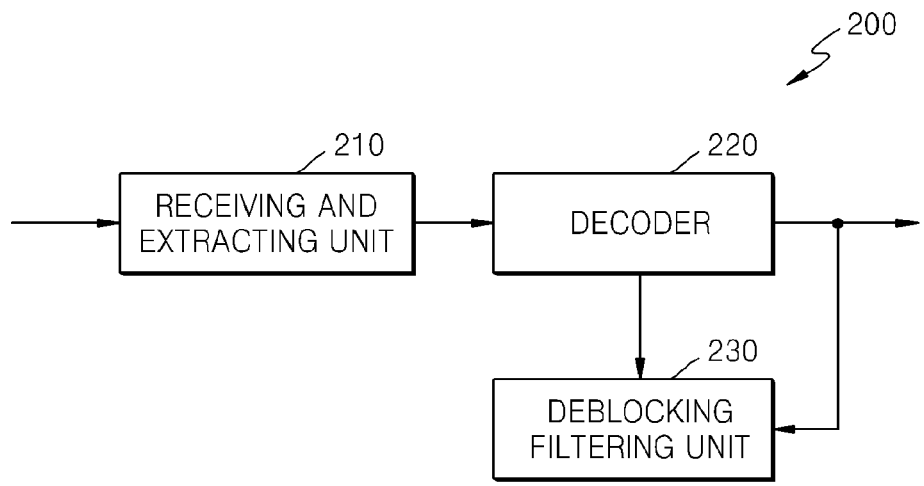
FIG. 2 is a block diagram of an apparatus for decoding a video, which performs deblocking filtering based on coding units according to a tree structure, according to an exemplary embodiment.

FIG. 2 is a block diagram of a video decoding apparatus 200 which perform deblocking filtering based on coding units according to a tree structure, according to an exemplary embodiment.

The video decoding apparatus 200 includes a receiving and extracting unit 210, a decoder 220, and a deblocking filtering unit 230.

The receiving and extracting unit 210 extracts image data encoded using coding units according to a tree structure, encoding mode information about the coding units, and information about deblocking filtering, according to maximum coding units, by receiving and parsing a bitstream about a video. The receiving and extracting unit 210 may extract the information about the deblocking filtering from an SPS or PPS of a picture.

The decoder 220 decodes the image data encoded according to the coding units, based on the encoding mode information about the coding units according to the tree structure extracted by the receiving and extracting unit 210.

The decoder 220 may determine a coding unit of a coded depth included in a maximum coding unit, a partition type, a prediction mode, and a transformation unit of the coding unit, based on the encoding mode information about the coding units according to the tree structure according to the maximum coding units.

The decoder 220 may decode encoded image data of a maximum coding unit by decoding the encoded image data based on the determined partition type, prediction mode, and transformation unit per coding unit from among the coding units according to the tree structure included in the maximum coding unit.

The image data decoded by the decoder 220 and the information about the deblocking filtering extracted by the receiving and extracting unit 210 are input to the deblocking filtering unit 230.

The deblocking filtering unit 230 determines a filtering boundary to which deblocking filtering is to be performed from among boundaries of at least one data unit from among coding units according to a tree structure, prediction units, and transformation units by using the information about the deblocking filtering. The deblocking filtering unit 230 determines filtering strength in the filtering boundary according to a prediction mode of a coding unit to which adjacent pixels belong based on the filtering boundary and transformation coefficient values of pixels adjacent to the filtering boundary, and performs deblocking filtering on the decoded image data based on the filtering strength.

By using the deblocking filtering unit 230, an error between a restored image and an original image may be reduced since prediction decoding is performed on a following picture by referring to a reference picture to which deblocking filtering is performed.

Figure 3:
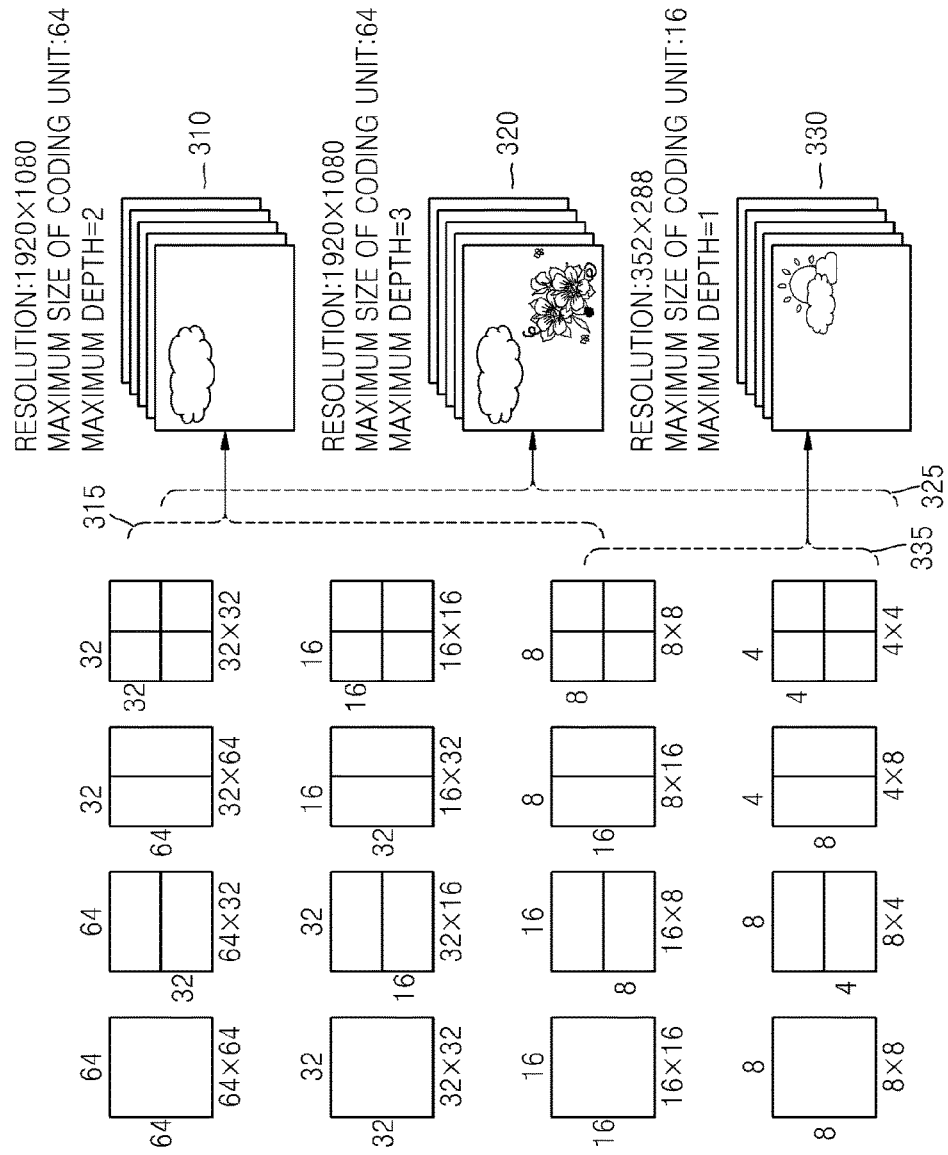
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into prediction units of 64×64, 64×32, 32×64, or 32×32, and a coding unit of 32×32 may be split into prediction units of 32×32, 32×16, 16×32, or 16×16, a coding unit of 16×16 may be split into prediction units of 16×16, 16×8, 8×16, or 8×8, and a coding unit of 8×8 may be split into prediction units of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth increases, detailed information may be precisely expressed.

Figure 4:
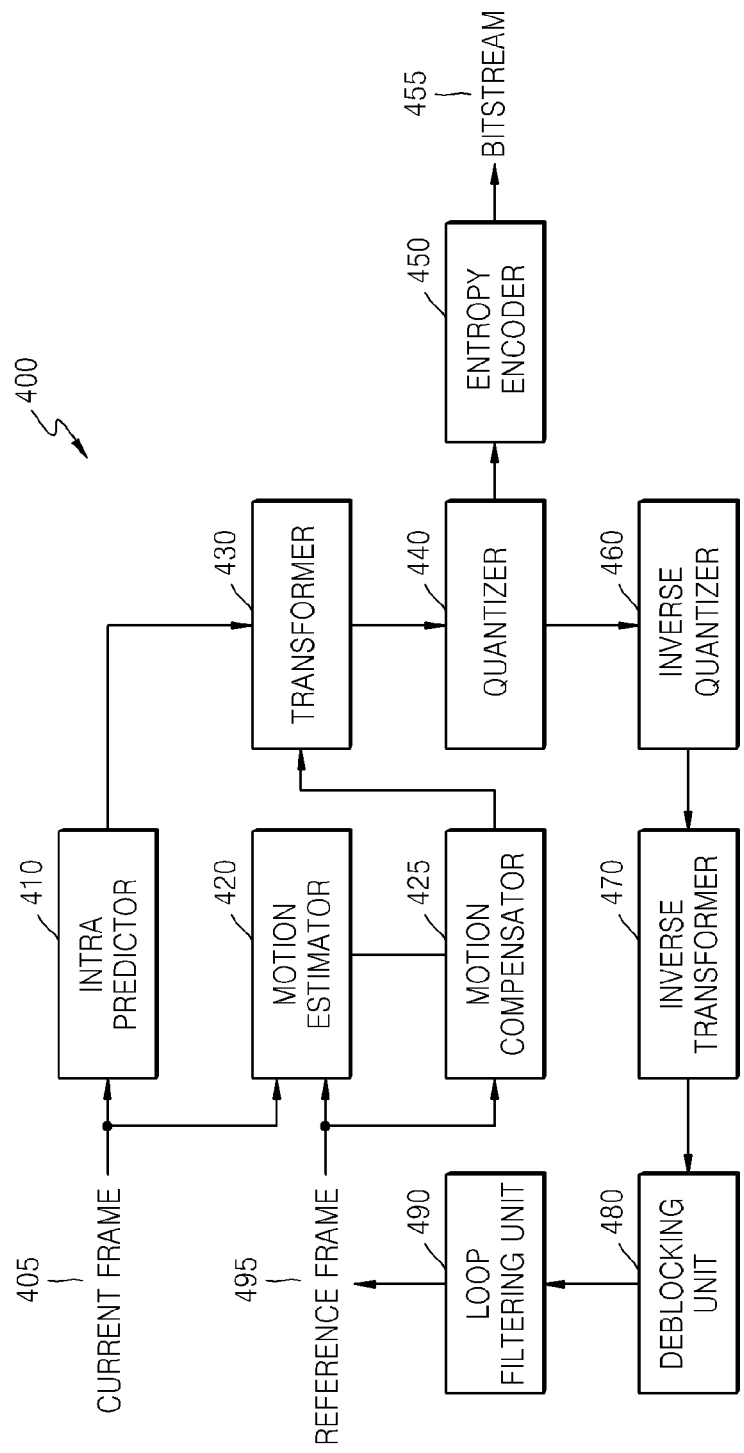
FIG. 4 is a block diagram of an image encoder based on coding units according to an exemplary embodiment.

FIG. 4 is a block diagram of an image encoder 400 based on coding units, according to an exemplary embodiment.

The image encoder 400 may correspond to the video encoding apparatus 100. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

The intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 of the image encoder 400 may operate considering the coding units according to the tree structure and maximum coding units.

Specifically, the deblocking unit 480 determines a filtering boundary to which deblocking filtering is to be performed based on a maximum size of a coding unit and coding units according to a tree structure, determines filtering strength in the filtering boundary according to a prediction mode of a coding unit to which adjacent pixels belong based on the filtering boundary and transformation coefficient values of pixels adjacent to the filtering boundary, and performs deblocking filtering based on the filtering strength.

Figure 5:
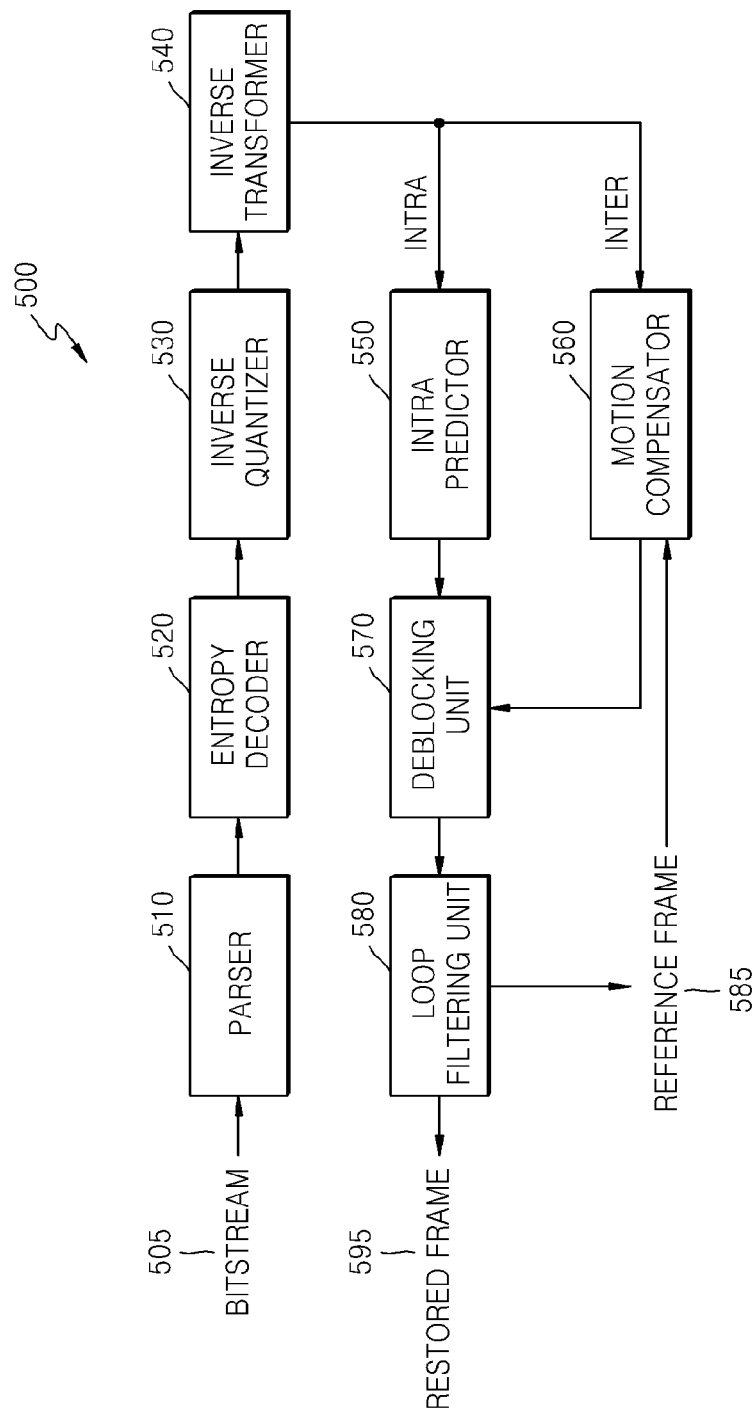
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

Since the image decoder 500 corresponds to the video decoding apparatus, the parser 510, the entropy decoder 520, the inverse quantizer 530, the inverse transformer 540, the intra predictor 550, the motion compensator 560, the deblocking unit 570, and the loop filtering unit 580 of the image decoder 500 perform operations based on coding units having a tree structure for each maximum coding unit.

Specifically, the deblocking unit 570 determines a filtering boundary to which deblocking filtering is to be performed from among boundaries of at least one data unit from among coding units according to a tree structure, prediction units, and transformation units by using parsed information about deblocking filtering. The deblocking unit 570 determines filtering strength in the filtering boundary according to a prediction mode of a coding unit to which adjacent pixels belong based on the filtering boundary and transformation coefficient values of pixels adjacent to the filtering boundary, and performs deblocking filtering with respect to image data decoded based on the filtering strength. Detailed operations about the deblocking filtering will be described in detail later with reference to FIG. 14.

Figure 6:
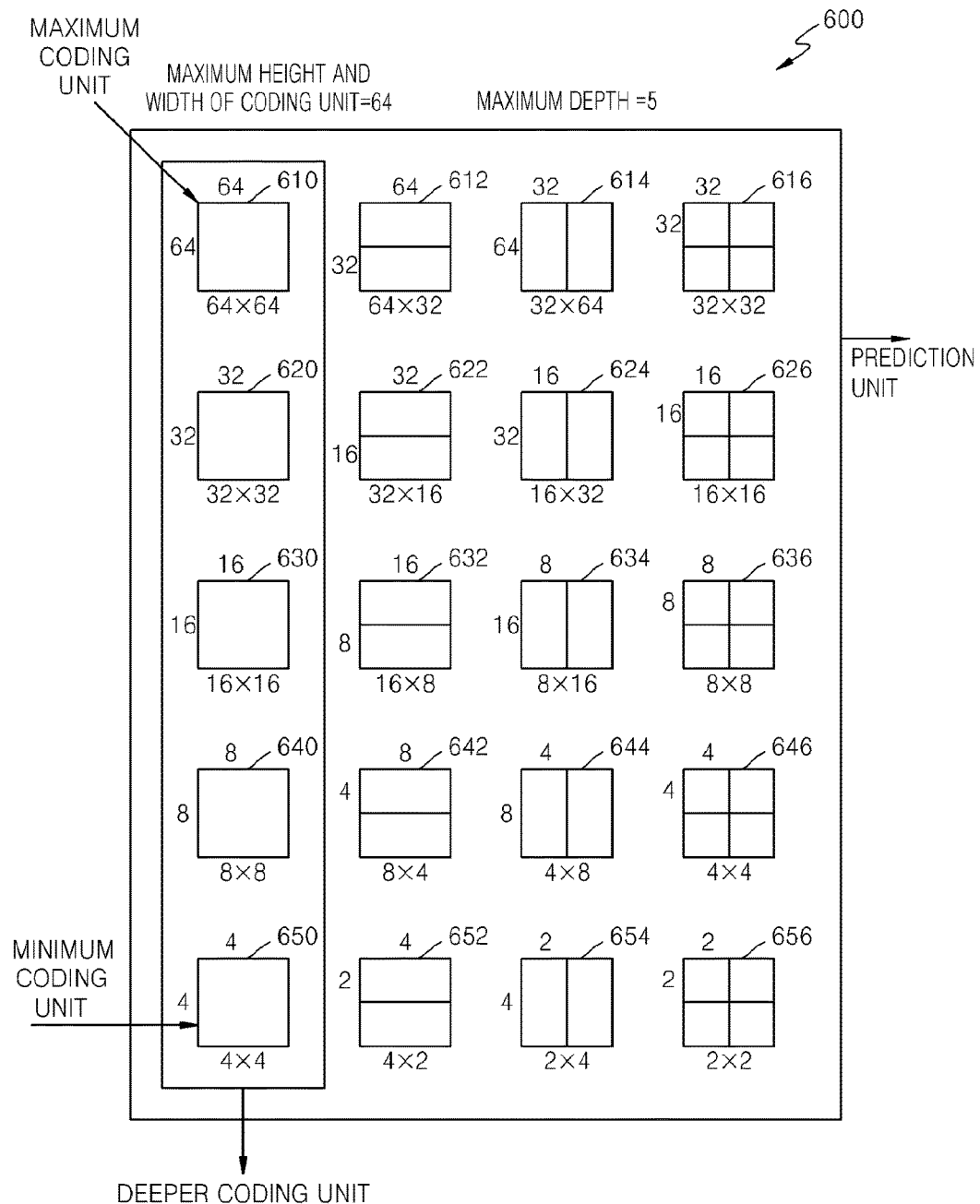
FIG. 6 is a diagram illustrating deeper coding units according to depths, and prediction units according to an exemplary embodiment.

FIG. 6 is a diagram illustrating deeper coding units according to depths, and prediction units according to an exemplary embodiment.

The video encoding apparatus 100 and the video decoding apparatus 200 use coding units according to a tree structure, which are independently determined according to regions, so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 5. The maximum depth shown in FIG. 6 denotes a total number of depth levels from a maximum coding unit to a minimum coding unit.

Since a depth increases along a vertical axis of the hierarchical structure 600, a height and a width of the deeper coding unit are each split. Also, a prediction unit or partitions, which are used for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth increases along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The partitions are arranged as prediction units of coding units, along the horizontal axis according to each depth. In other words, a prediction unit of the coding unit 610 having the size of 64×64 and the depth of 0 includes a partition 610 having a size of 64×64, partitions 612 having the size of 64×32, partitions 614 having the size of 32×64, or partitions 616 having the size of 32×32. In other words, the coding unit 610 may be a square data unit having a minimum size including the partitions 610, 612, 614, and 616.

Similarly, a prediction unit of the coding unit 620 having the size of 32×32 and the depth of 1 may include a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may include a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may include a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 may include a partition 650 having a size of 4×4, partitions 652 having a size of 4×2, partitions 654 having a size of 2×4, and partitions 656 having a size of 2×2.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth increases. For example, four coding units corresponding to a depth of 2 are included in data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth increases along the vertical axis of the hierarchical structure 600. A depth and a prediction unit having the minimum encoding error in the coding unit 610 may be selected as the coded depth and a partition type of the coding unit 610.

Figure 7:
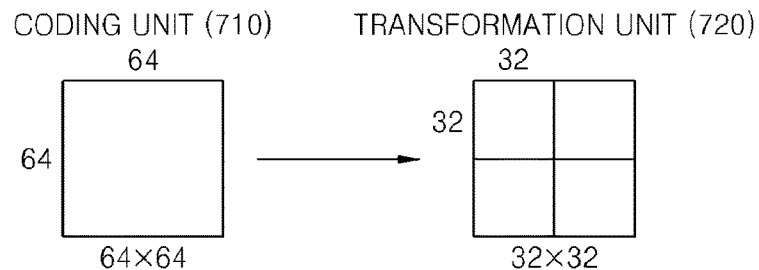
FIG. 7 is a diagram for describing a relationship between a coding unit and transformation units, according to an exemplary embodiment.

FIG. 7 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 8:
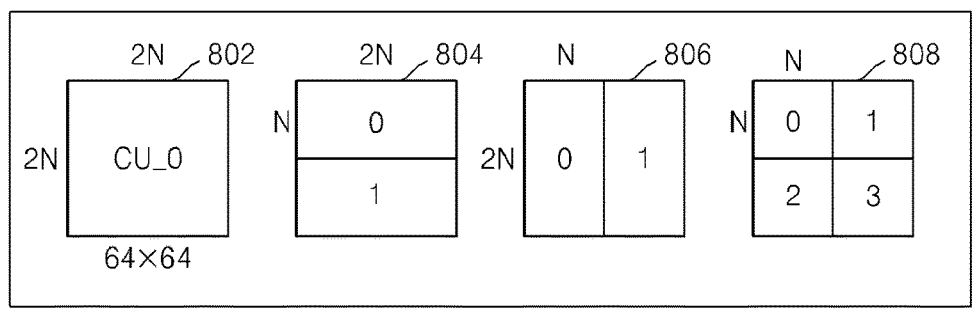
FIG. 8 is a diagram for describing encoding information of coding units corresponding to a coded depth, according to an exemplary embodiment.
Figure 8:
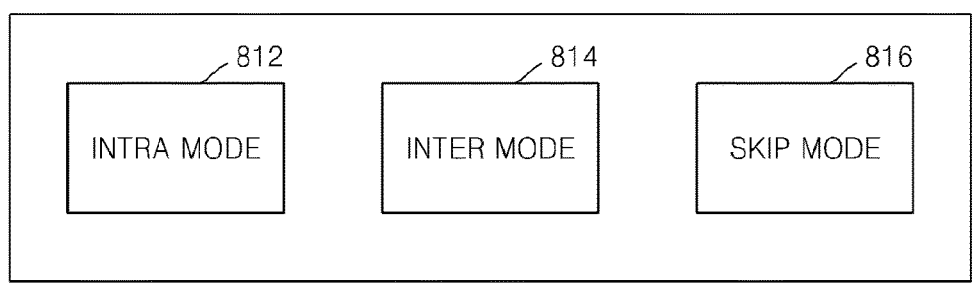
Figure 8:
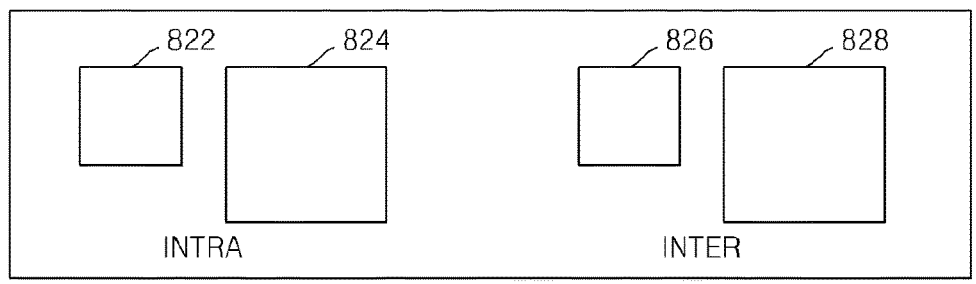

FIG. 8 is a diagram for describing encoding information of coding units corresponding to a coded depth, according to an exemplary embodiment.

The video encoding apparatus 100 may encode and transmit information 800 about a partition type, information 810 about a prediction mode, and information 820 about a size of a transformation unit for each coding unit corresponding to a coded depth, as encoding mode information about coding units according to a tree structure.

The information 800 indicates information about a type a current coding unit is split as a prediction unit (partition) for prediction encoding the current coding unit. For example, a current coding unit CU_0 having a size of 2N×2N and a depth of 0 may be used as a prediction unit after being split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each coding unit. For example, the information 810 may indicate a mode of prediction encoding performed on a prediction unit indicated by the information 800, i.e., an intra mode 812, an inter mode 814, or a skip mode 816.

The information 820 indicates a transformation unit to be based on when transformation is performed on a current coding unit. For example, the transformation unit may have one of a first size 822 and a second size 824 of an intra mode, and a first size 826 and a second size 828 of an inter mode.

The receiving and extracting unit 220 of the video decoding apparatus 200 may extract the information 800, 810, and 820 according to each deeper coding unit, and the decoder 220 may use the information 800, 810, and 820 for decoding.

Figure 9:
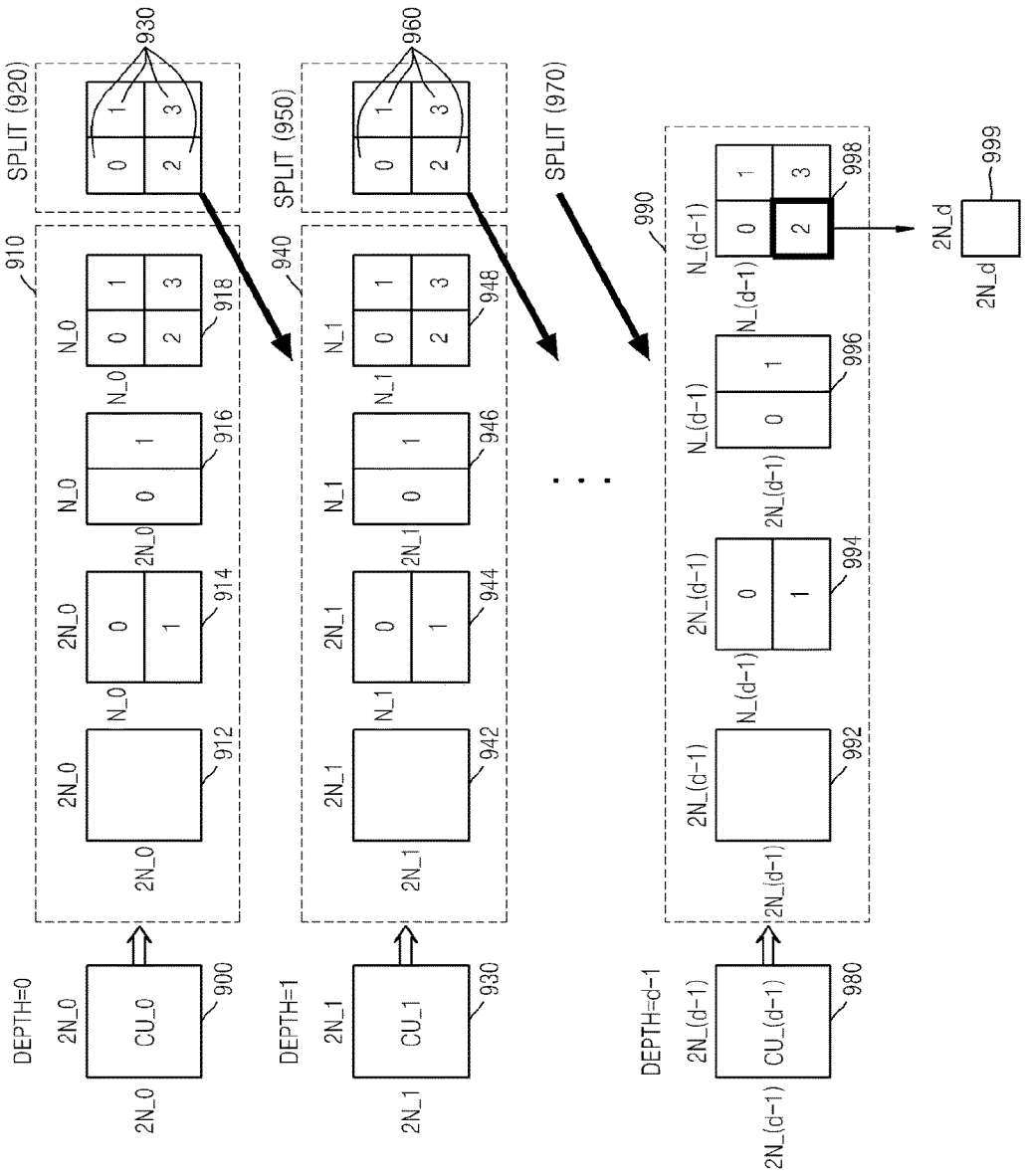
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto.

Prediction encoding is repeatedly performed on one prediction unit having a size of 2N_0×2N_0, two prediction units having a size of 2N_0×N_0, two prediction units having a size of N_0×2N_0, and four prediction units having a size of N_0×N_0, according to each partition type. The prediction encoding in an intra mode and an inter mode may be performed on the prediction units having the sizes of 2N_0×2N_0, N_0×2N_0, 2N_0×N_0, and N_0×N_0. The prediction encoding in a skip mode is performed only on the prediction unit having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1. If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one prediction unit having a size of 2N_(d−1)×2N_(d−1), two prediction units having a size of 2N_(d−1)×N_(d−1), two prediction units having a size of N_(d−1)×2N_(d−1), four prediction units having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a square data unit obtained by splitting a minimum coding unit 980 by 4, i.e., may be a square data unit having a maximum size that may be included in coding units of all coded depth, prediction units, and transformation units included in the maximum coding unit. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth and a prediction of the coded depth may be encoded and transmitted as information about an encoding mode. Also, since a coding unit is split from a depth of 0 to a coded depth, only split information of the coded depth is set to 0, and split information of depths excluding the coded depth is set to 1.

The receiving and extracting unit 210 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth to decode encoded data of the corresponding coding unit.

Figure 10:
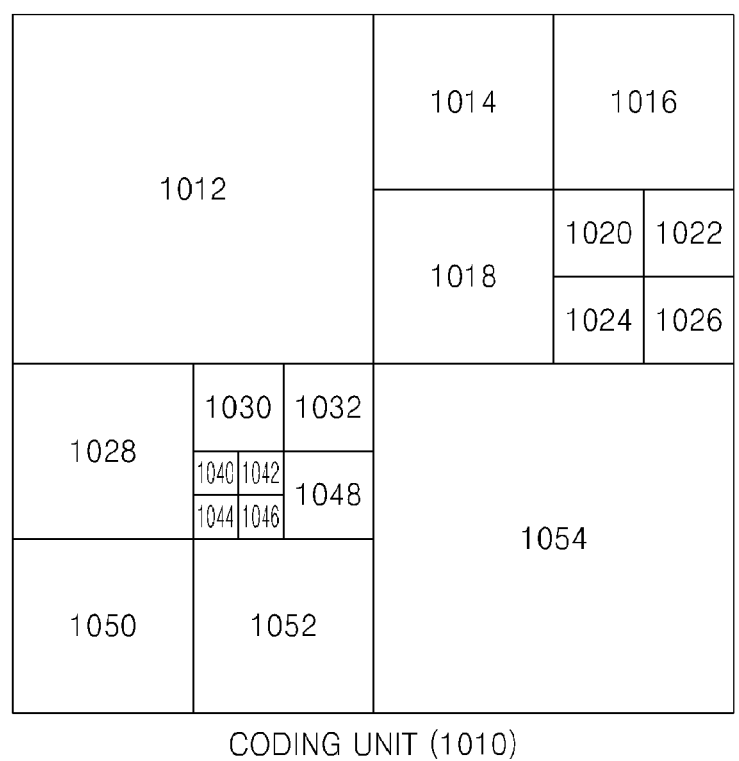
FIGS. 10 through 12 are diagrams for describing a relationship between coding units, prediction units, and transformation units, according to an exemplary embodiment.
Figure 11:
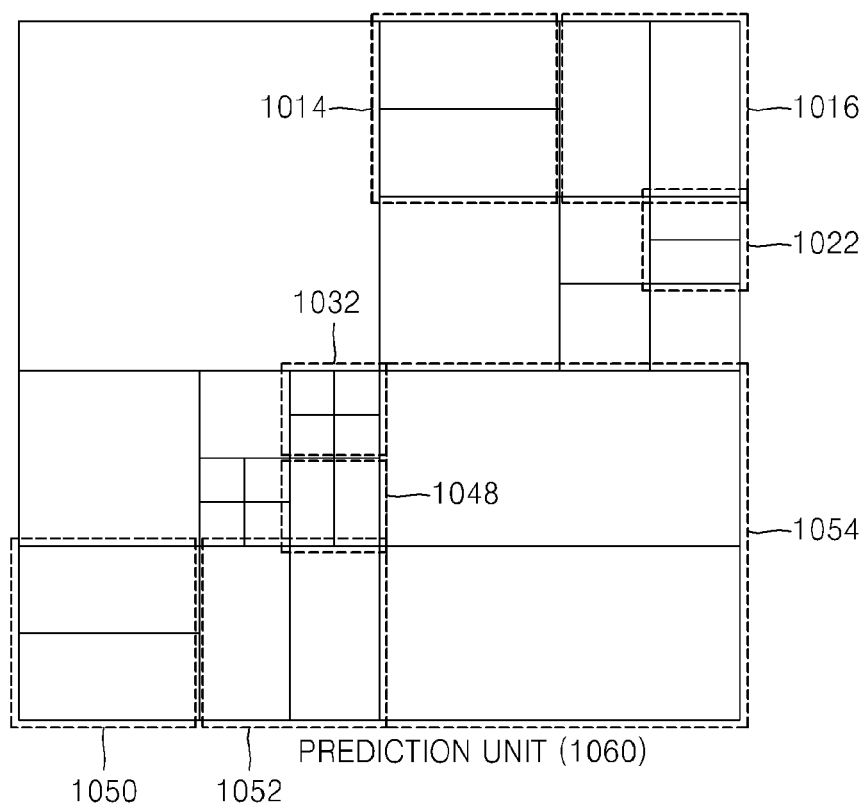
Figure 12:
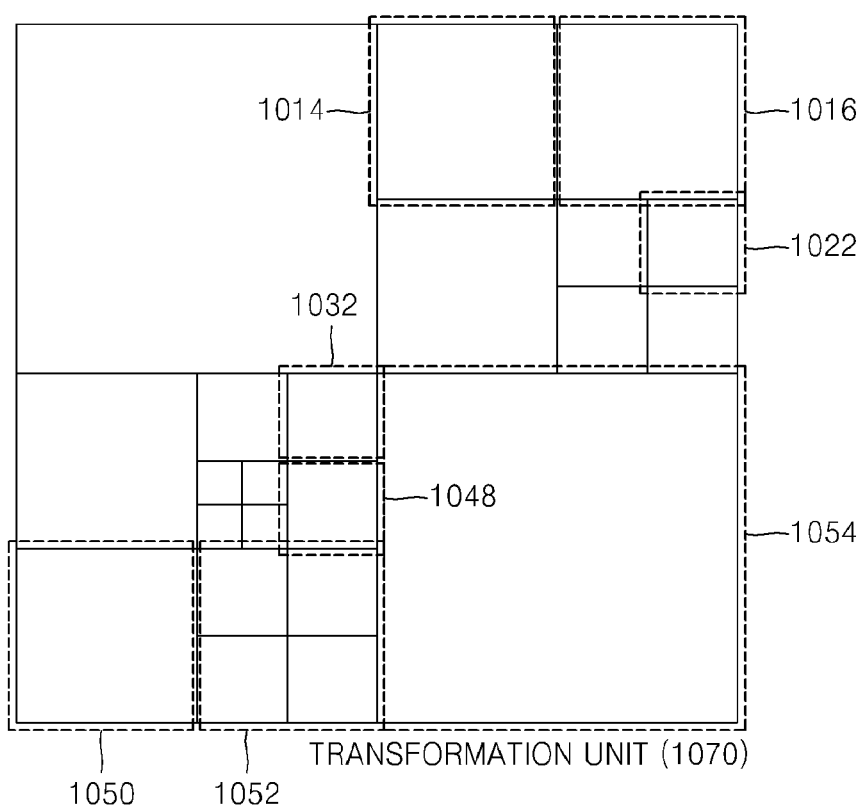

FIGS. 10 through 12 are diagrams for describing a relationship between coding units 1010, prediction units 1060, and transformation units 1070, according to an exemplary embodiment.

The coding units 1010 are coding units according to a tree structure determined by the video encoding apparatus 100, in a current maximum coding unit. The prediction units 1060 are prediction units of coding units of each coded depth in the coding units 1010, and the transformation units 1070 are transformation units of each of the coding units 1010.

When a depth of a maximum coding unit is 0 in the coding units 1010, the coding units 1010 include coding units 1012 and 1054 having a depth of 1, coding units 1014, 1016, 1018, 1028, 1050, and 1052 having a depth of 2, coding units 1020, 1022, 1024, 1026, 1030, 1032, and 1048 having a depth of 3, and coding units 1040, 1042, 1044, and 1046 having a depth of 4.

In the prediction units 1060, some coding units 1014, 1016, 1022, 1032, 1048, 1050, 1052, and 1054 are obtained by splitting the coding units in the coding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. In other words, prediction units are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are data units having different sizes or shapes from those in the prediction units 1060. In other words, transformation units and prediction units of one coding unit are independently determined. Accordingly, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained.

Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| | Split Information 0 (Encoding on Coding Unit having Size of 2N × 2N and Current Depth of d) | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The transmitter 120 of the video encoding apparatus 100 may output the encoding information about the coding units having a tree structure, and the receiving and extracting unit 210 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types according to split information of the transformation unit. In other words, if the split information of the transformation unit is 0, the transformation unit having a size of 2N×2N may be set to be the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Thus, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
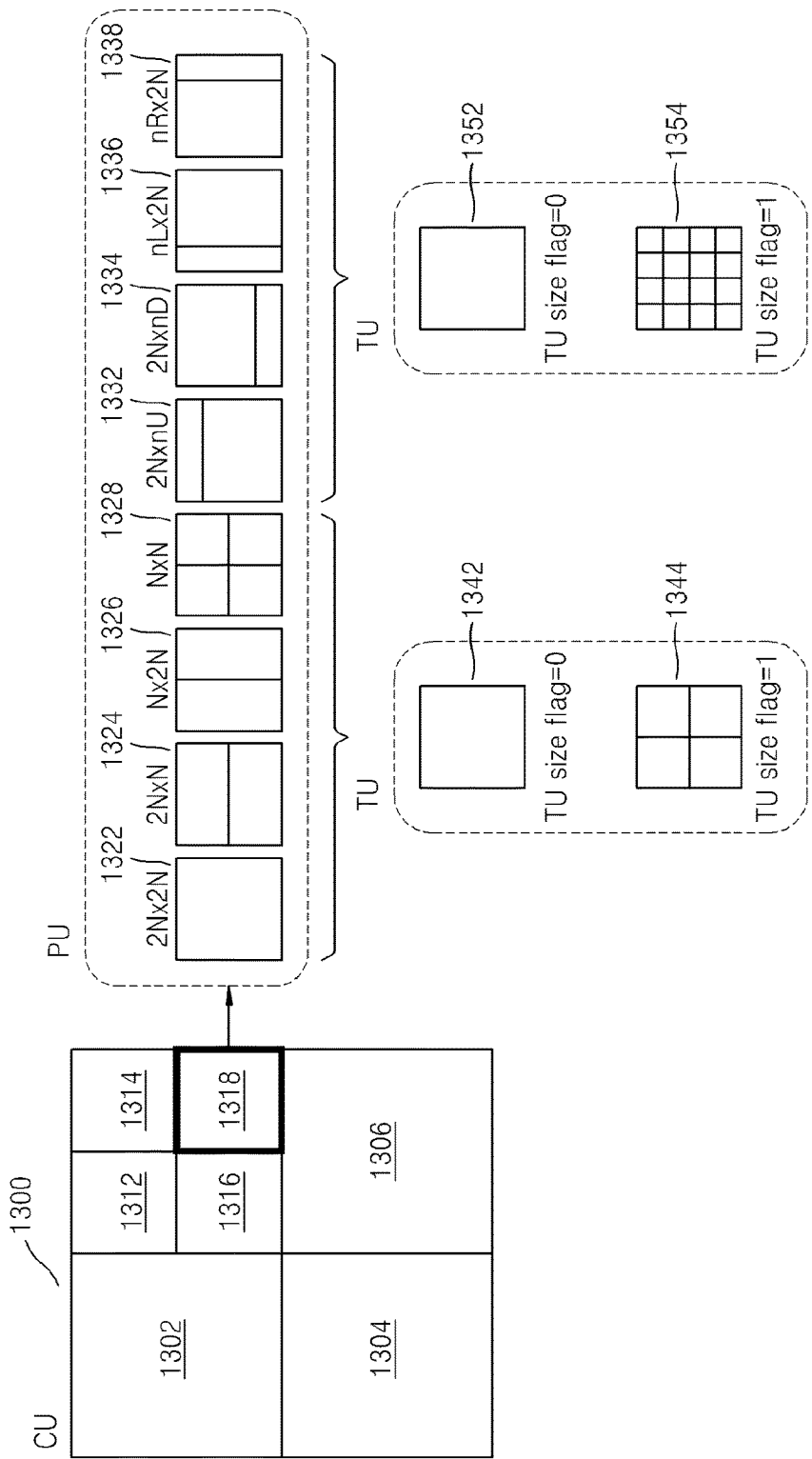
FIG. 13 is a diagram for describing a relationship between a coding unit, a prediction unit, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Figure 14:
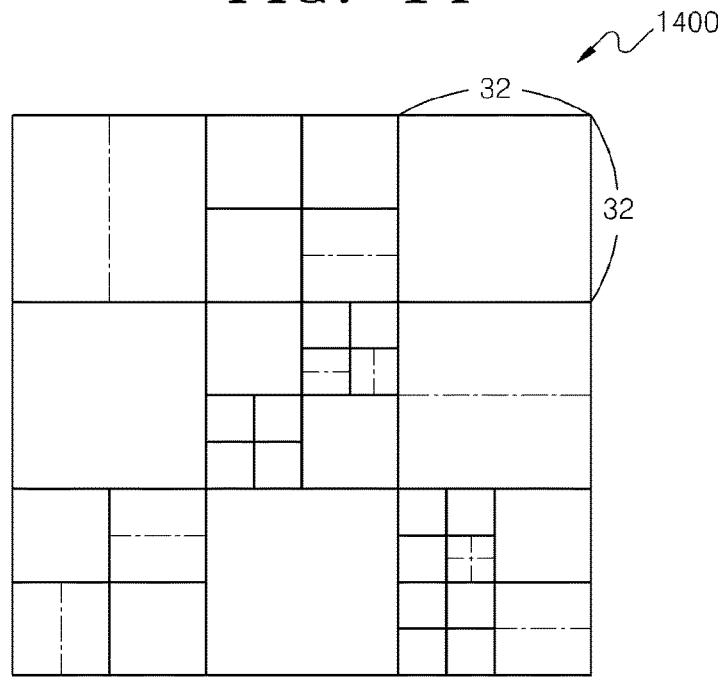
FIG. 14 illustrates maximum coding units, coding units according to a tree structure obtained by subdividing each maximum coding unit, prediction units obtained by subdividing each coding unit, and data units including transformation units.

FIG. 14 illustrates maximum coding units, coding units according to a tree structure obtained by subdividing each maximum coding unit, prediction units obtained by subdividing each coding unit, and data units including transformation units. In other words, FIG. 14 illustrates data unit 1400 including the coding units, the prediction units, and the transformation units of FIGS. 10 through 12 described above by overlapping the coding units, prediction units, and transformation units. In FIG. 14, it is assumed that a size of the maximum coding unit is 32×32, and coding units of coded depths are shown in solid lines and prediction units and transformation units obtained by splitting the coding units of coded depths are shown in alternate long and short dash lines in the coding units. Also, the coded depths of the coding units having a tree structure are 0, 1, and 2, wherein a maximum depth is 3.

Referring to FIG. 14, the data unit 1400 includes coding units of coded depths of 9 maximum coding units having a size of 32×32. As described above, an optimum coding unit is determined by recursively performing encoding on coding units having a hierarchical structure classified according to depths, for each maximum coding unit, while an optimum prediction unit and an optimum transformation unit for prediction and transformation may be determined according to each coding unit. The deblocking filtering unit 130 determines a filtering boundary to which deblocking filtering is to be performed based on at least one data unit 1400 from among the coding units, the prediction units, and the transformation units shown in FIG. 14.

In detail, the deblocking filtering unit 130 may determine a filtering boundary based on boundaries of data units having a predetermined size or above from among the coding units, the prediction units, and the transformation units. In other words, referring to FIG. 14, when a current picture is split into maximum coding units having a size of 32×32, each maximum coding unit is again split into coding units having a hierarchical structure classified according to depths, and each coding unit is again split into prediction units and transformation units having a smaller size than the coding units according to depths for prediction and transformation, only a boundary of data units having a predetermined size or above from among boundaries of the coding units, the prediction units, and the transformation units may be determined to be a filtering boundary to which deblocking filtering is to be performed.

Figure 15:
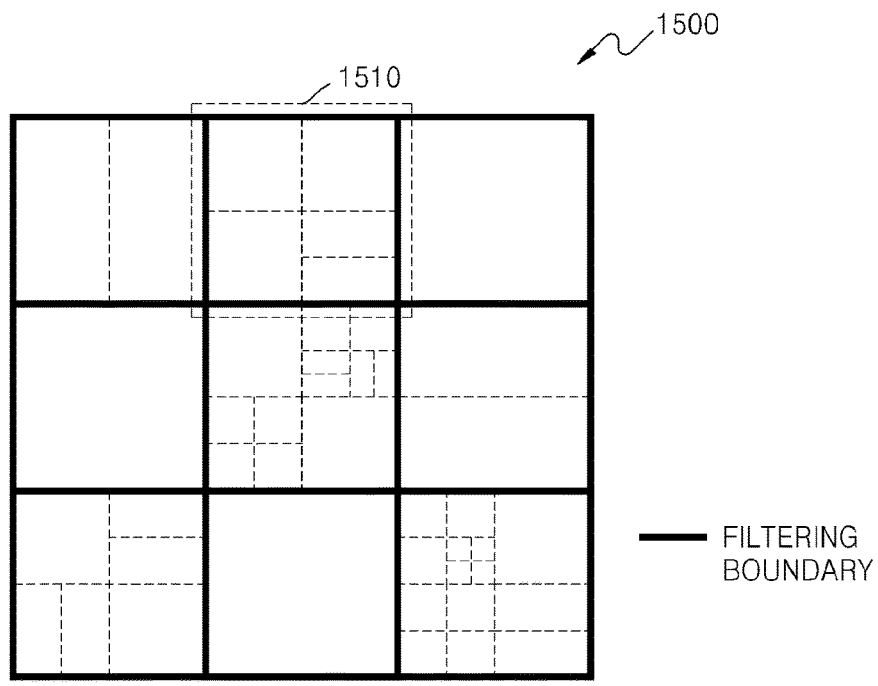
FIGS. 15 through 17 each illustrate filtering boundaries determined based on boundaries of data units having a predetermined size or above, with respect to the data units of FIG. 14.
Figure 16:
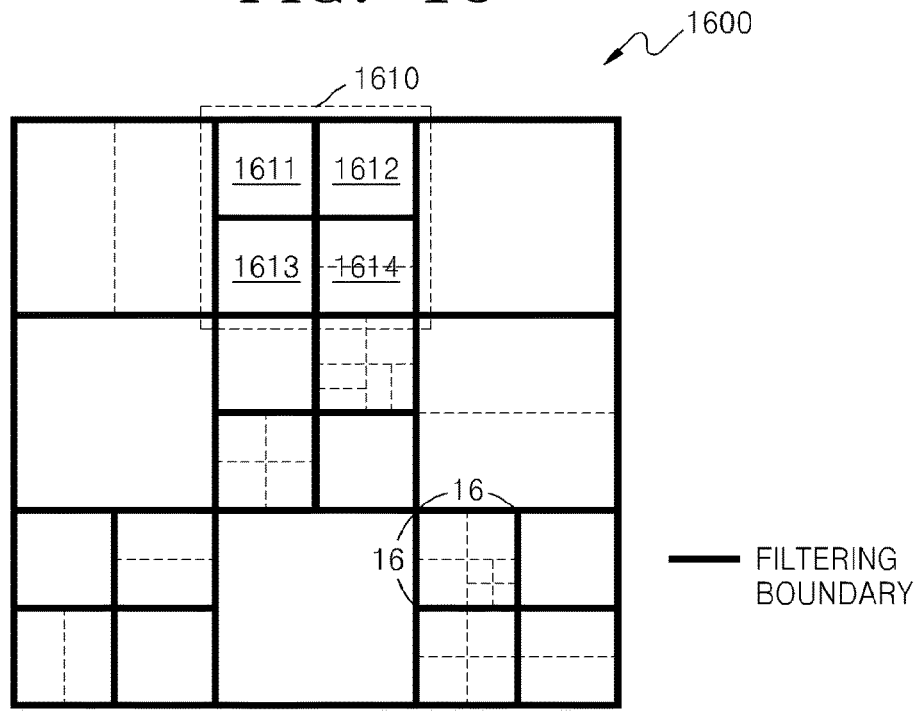
Figure 17:
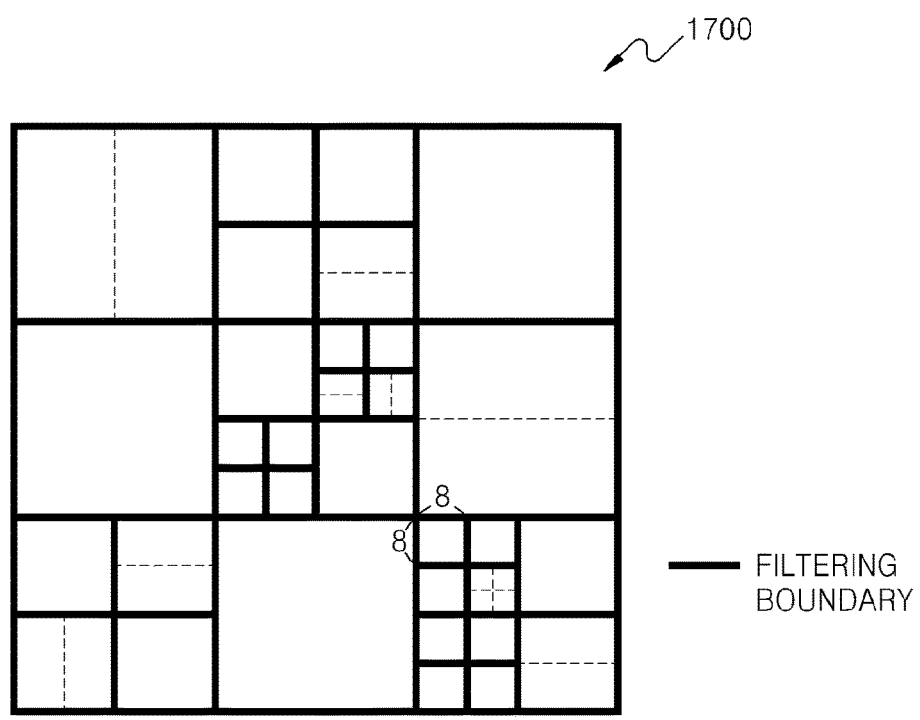

FIGS. 15 through 17 each illustrate filtering boundaries determined based on boundaries of data units having a predetermined size or above, with respect to the data unit 1400 of FIG. 14.

Referring to FIGS. 14 and 15, when the coding units, the prediction units, and the transformation units of FIG. 14 are determined, the deblocking filtering unit 130 may determine only boundary of data units having a predetermined size or above from among boundaries of the coding units, the prediction units, and the transformation units as a filtering boundary to which deblocking filtering is to be performed. For example, the deblocking filtering unit 130 may determine only boundaries of the coding units, the prediction units, and the transformation units, which have a size equal to or larger than 32×32, as filtering boundaries to which deblocking filtering is to be performed as shown in data unit 1500 of FIG. 15, determine only boundaries of the coding units, the prediction units, and the transformation units, which have a size equal to or larger than 16×16, as filtering boundaries to which deblocking filtering is to be performed as shown in data unit 1600 of FIG. 16, or determine only boundaries of the coding units, the prediction units, and the transformation units, which have a size equal to or larger than 8×8, as filtering boundaries to which deblocking filtering is to be performed as shown in data unit 1700 of FIG. 17. As such, when only boundaries of data units having a predetermined size or above are determined to be filtering boundaries to which deblocking filtering is to be performed, a filtering boundary to which filtering is to be performed is changed with respect to the same split shape. For example, when deblocking filtering is performed only on the boundaries of data units having a size of 32×32 or above as shown in FIG. 15, an inner boundary is not considered to be a filtering boundary, except a boundary portion overlapping with a maximum coding unit 1510 having a size of 32×32 from among the boundaries of the coding units, the transformation units, and the prediction units obtained by splitting the maximum coding unit 1510. On the other hand, when deblocking filtering is performed only on the boundary of the data units having a size of 16×16 or above as shown in FIG. 16, inner boundaries of coding units 1611 through 1614 obtained by splitting a maximum coding unit 1610 corresponding to the maximum coding unit 1510 of FIG. 15 are also determined as filtering boundaries.

Meanwhile, the deblocking filtering unit 130 does not determine a boundary of data units having a predetermined size or above as a filtering boundary if the boundary is a frame boundary. In other words, deblocking filtering according to an exemplary embodiment is not performed on an outermost boundary corresponding to an edge of a picture.

Figure 18:
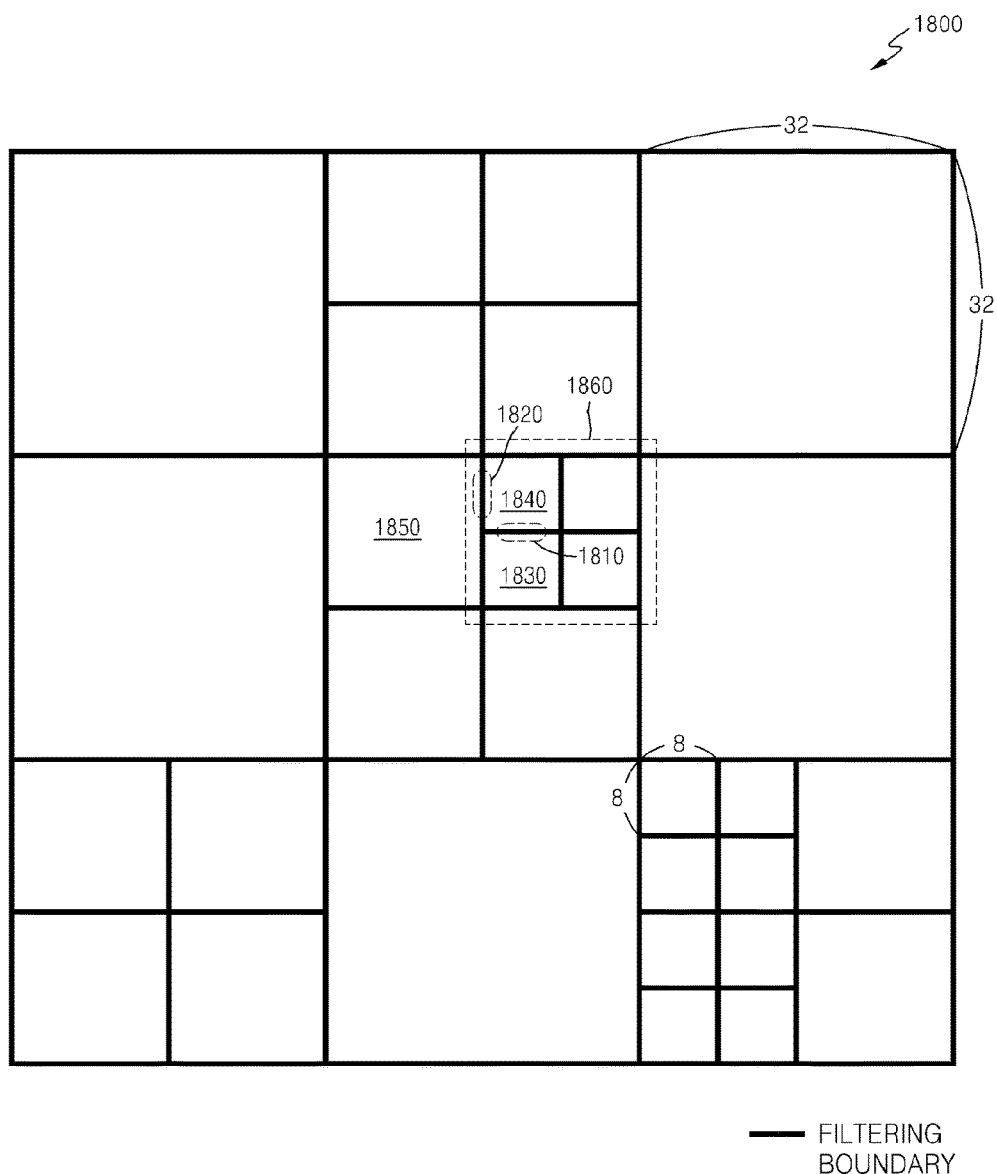
FIG. 18 is a reference diagram for describing a deblocking filtering process according to an exemplary embodiment, based on the filtering boundaries of FIG. 17.

FIG. 18 is a reference diagram for describing a deblocking filtering process according to an exemplary embodiment, based on the filtering boundaries of FIG. 17.

When filtering boundaries to which deblocking filtering is to be performed are determined based on boundaries of data units having a predetermined size or above, the deblocking filtering unit 130 determines filtering strength in the filtering boundaries based on a prediction mode of a coding unit to which adjacent pixels belong based on the filtering boundary and transformation coefficient values of pixels adjacent to the filtering boundary.

Hereinafter, a process of performing deblocking filtering based on filtering boundaries, such as a horizontal direction filtering boundary 1810 and a vertical direction filtering boundary 1820 between data unit 1840 and data unit 1850 in data unit 1800 of FIG. 18 will be described.

Figure 19A:
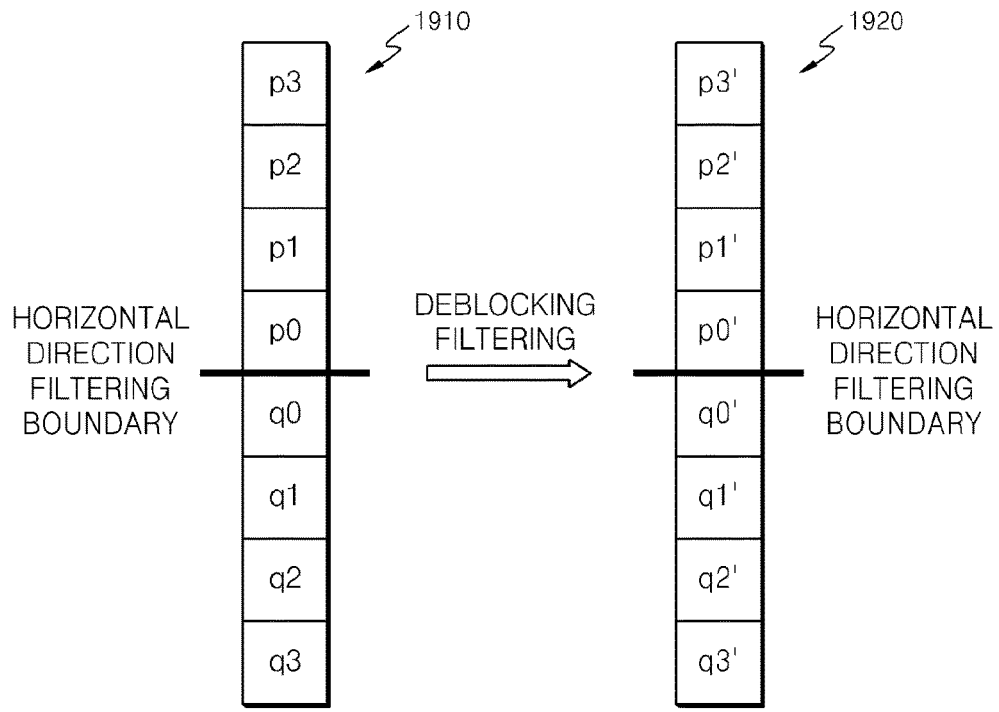
FIGS. 19A and 19B illustrate pixels located on filtering boundaries to describe deblocking filtering according to an exemplary embodiment.
Figure 19B:
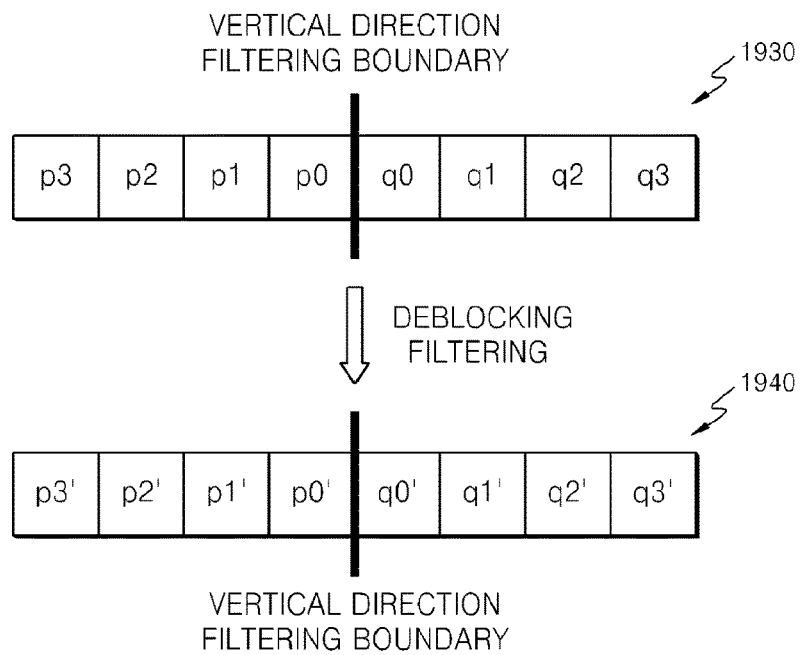

FIGS. 19A and 19B illustrate pixels located on filtering boundaries to describe deblocking filtering according to an exemplary embodiment.

Referring to FIG. 19A, pixel values of pixels 1910 adjacent to the top and bottom of a horizontal direction filtering boundary before deblocking filtering are defined to be p0 through p3 and q0 through q3. Also, pixel values of pixels 1920 adjacent to the top and bottom of the horizontal direction filtering boundary after deblocking filtering are defined to be p0' through p3' and q0' through q3'. Similarly, referring to FIG. 19B, pixel values of pixels 1930 adjacent to left and right of a vertical direction filtering boundary before deblocking filtering are defined to be p0 through p3 and q0 through q3. Also, values of pixels 1940 adjacent to the left and right of the vertical direction filtering boundary after deblocking filtering are defined to be p0' through p3' and q0' through q3'. Deblocking filtering operations based on the horizontal and vertical direction filtering boundaries are identical except for a direction difference.

The deblocking filtering unit 130 determines filtering strength based on whether the prediction mode of the coding unit to which the adjacent pixels belong based on the filtering boundary is an intra mode or an inter mode, and whether the transformation coefficient values of the pixels adjacent to the filtering boundary are 0. When boundary strength (Bs) denotes filtering strength, Bs may be classified into 5 stages from 0 through 4. A size of Bs is proportional to the filtering strength. In other words, when Bs=4, filtering strength is the strongest and when Bs=0, filtering strength is the weakest. Here, deblocking filtering may not be performed when Bs=0.

In detail, when p0 and q0 denote pixels that are adjacent to the filtering boundary and are divided based on the filtering boundary, the deblocking filtering unit 130 may determine the filtering strength to have a value of Bs=4 when a prediction mode of at least one coding unit to which p0 and q0 belong is an intra mode and the filtering boundary is a boundary of coding units. For example, when deblocking filtering is performed based on the horizontal direction filtering boundary 1810 of FIG. 18, the deblocking filtering unit 130 may determine the filtering strength to have a value of Bs=4 when a prediction mode of at least one of a coding unit 1840 to which p0 belong and a coding unit 1830 to which q0 belong, which are nearest pixels based on the horizontal direction filtering boundary 1810 in data unit 1860, is an intra mode and a current filtering boundary is a boundary of coding units. Here, whether the horizontal direction filtering boundary 1810 is a boundary of coding units may be determined based on whether the coding unit 1840 to which p0 belong and the coding unit 1830 to which q0 belong are data units based on deeper coding units, or whether the horizontal direction filtering boundary 1810 corresponds to a boundary of the prediction units and transformation units of FIGS. 11 and 12 obtained by splitting coding units for prediction and transformation.

Alternatively, the deblocking filtering unit 130 determines the filtering strength to have a value of Bs=3 when the prediction mode of at least one of the coding units to which p0 and q0 belong is an intra mode and the filtering boundary is not a boundary of coding units.

Alternatively, the deblocking filtering unit 130 determines the filtering strength to have a value of Bs=2 when the prediction modes of the coding units to which p0 and q0 belong are not intra modes and a transformation coefficient value of at least one of transformation units to which p0 and q0 belong is not 0.

Alternatively, the deblocking filtering unit 130 determines the filtering strength to have a value of Bs=1 when the prediction modes of the coding units to which p0 and q0 belong are not intra modes, the transformation coefficient values of the transformation units to which p0 and q0 belong are 0, and any one of a reference frame and a motion vector used for motion prediction of prediction units to which p0 and q0 belong is different each other.

Alternatively, the deblocking filtering unit 130 determines the filtering strength to have a value of Bs=0 when the prediction modes of the coding units to which p0 and q0 belong are not intra modes, the transformation coefficient values of the transformation units to which p0 and q0 belong are 0, and the reference frame and the motion vector used for motion prediction of the prediction units to which p0 and q0 belong are the same.

Meanwhile, the deblocking filtering unit 130 may determine whether to perform deblocking filtering on a filtering boundary based on the filtering strength and a result of comparing a predetermined threshold value and a difference between absolute values of pixel values of a predetermined number of adjacent pixels based on the filtering boundary. In detail, the deblocking filtering unit 130 determines to perform deblocking filtering only when an absolute value of a difference between pixel values of pixels adjacent to the filtering boundary and divided based on the filtering boundary and an absolute value of a difference between pixel values of pixels adjacent to the same side based on the filtering boundary are smaller than a predetermined threshold value determined according to a quantization parameter of transformation units to which pixels belong, and the filtering strength is not the weakest. For example, the deblocking filtering unit 130 may perform deblocking filtering on a filtering boundary only when i) the filtering strength Bs is not 0 and ii) a condition of $|p0-q0|<\alpha$; $|p1-q0|<\beta$; $|q1-q0|<\beta$ is satisfied. Here, the threshold values may be predetermined based on quantization parameters used during quantization of transformation units to which p0 and q0 belong.

FIGS. 20A and 20B are reference tables for determining threshold values $\alpha$ and $\beta$, according to an exemplary embodiment.

Referring to FIGS. 20A and 20B, the threshold values $\alpha$ and $\beta$ are determined based on indexA and indexB, wherein indexA and indexB are values determined according to equations indexA=Clip3(0, 51, qPav+FilterOffsetA) and indexB=Clip3(0, 51, qPav+FilterOffsetB). Here, qPav denotes an average value of quantization parameters of transformation units to which p0 and q0 belong. clip3(a,b,c) denotes an operation of clipping a value of c such that $a \leq c \leq b$. For example, the equation indexA=Clip3(0, 51, qPav+FilterOffsetA) is 0 when a value of qPav+FilterOffsetA is lower than or equal to 0 and is 51 when the value of qPav+FilterOffsetA is equal to or higher than 51. Also, FilterOffsetA and FilterOffsetB denote predetermined offset values set respectively with respect to the threshold values $\alpha$ and $\beta$.

Figure 21:
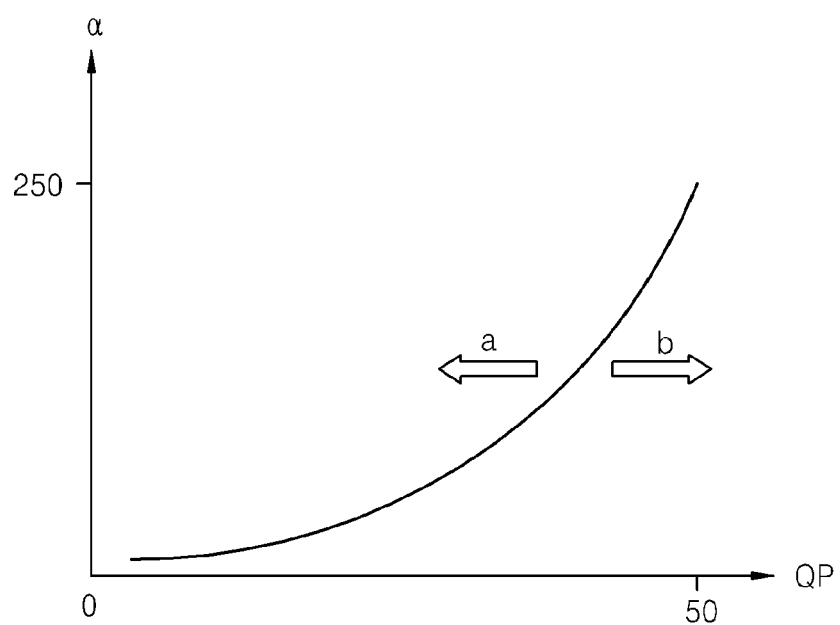
FIG. 21 is a reference diagram for describing a process of setting an offset value with respect to a threshold value $\alpha$, according to an exemplary embodiment.

FIG. 21 is a reference diagram for describing a process of setting an offset value with respect to a threshold value $\alpha$, according to an exemplary embodiment. For example, when the threshold value $\alpha$ is set in proportional to a quantization parameter as a curve shown in FIG. 21, a value of indexA is increased as a value of FilterOffsetA is increased, and as a result, a curve set as a default is moved in a right direction (b direction) as shown in FIG. 21. When the value of FilterOffsetA is decreased, the value of indexA is decreased, and thus the curve set as a default is moved in a left direction (a direction) as shown in FIG. 21. As such, FilterOffsetA and FilterOffsetB may be used to adjust filtering strength.

As such, the deblocking filtering unit 130 determines whether to perform deblocking filtering on a filtering boundary based on quantization parameters of transformation units to which p0 and q0 belong and predetermined offset values.

With respect to a boundary to which deblocking filtering is to be performed, the deblocking filtering unit 130 determines a number and filter tap coefficients of pixels to be filtered adjacent to a filtering boundary, based on filtering strength, an absolute value of a difference between pixel values of pixels adjacent to the filtering boundary and divided based on the filtering boundary, and an absolute value of a difference between pixel values of pixels adjacent to the same side based on the filtering boundary. Also, the deblocking filtering unit 130 performs filtering by changing pixel values of pixels to be filtered via a weighted sum based on the filter tap coefficients.

In detail, when filtering strength of a current filtering boundary is Bs<4, the deblocking filtering unit 130 generates p1', p0', q0', and q1' by using a 4-tap finite impulse response filter (FIR) using p1, p0, q0, and q1 as inputs. The deblocking filtering unit 130 generates a value of delta $\Delta$ according to an equation: $\Delta=\text{clip3}[-tc,tc,((((q0-p0)\ll 2)+(p1-q1)*4)\gg 3))$. Here, tc may be determined based on $|p2-p0|$, $|q2-q0|$ and a threshold value $\beta$.

FIGS. 22A and 22B are reference tables used to determine a predetermined intermediate value (tc) used during a deblocking filtering process, according to an exemplary embodiment. As shown in FIGS. 22A and 22B, tc may be determined by using values pre-determined in a table according to indexA and filtering strength bS.

Also, the deblocking filtering unit 130 generates pixel values of p0 and q0 that are nearest to a filtering boundary and deblocking filtered according to equations p0'=p0+$\Delta$ and q0'=q0+$\Delta$. Pixel values of p1 and q1 that are adjacent to the filtering boundary after p0 and q0 are changed according to equations p1'=p1+$\Delta$/2 and q1'=q1+$\Delta$/2.

Meanwhile, when filtering strength has a value of Bs=4 in a current filtering boundary, the deblocking filtering unit 130 determines a number and filter tap coefficients of pixels that are filtered adjacent to the filtering boundary based on an absolute value of a difference between pixel values of pixels adjacent to the filtering boundary and divided based on the filtering boundary and an absolute value of a difference between pixel values of pixels adjacent to the same side based on the filtering boundary. In detail, when $|p2-p0|<\beta$, $|p0-q0|<\text{round}(\alpha/4)$, the deblocking filtering unit 130 sets input pixel values to be p2, p1, p0, q0, and q1 with respect to p0 nearest to the filtering boundary, and generates p0' that is filtered by using a 5-tap filter having a filter tap coefficient of {1,2,2,2,1}.

With respect to p1 nearest to the filtering boundary after p0, the deblocking filtering unit 130 sets input pixel values to be p2, p1, p0, and q1, and generates p1' filtered by using a 4-tap filter having a filter tap coefficient of {1,1,1,1}.

With respect to p2 nearest to the filtering boundary after p1, the deblocking filtering unit 130 sets input pixel values to be p3, p2, p1, p0, and q1, and generates p2' filtered by using a 5-tap filter having a filter tap coefficient of {2, 3, 1, 1, 1}.

Similarly, when $|q2-q0|<\beta$; $|p0-q0|<\text{round}(\alpha/4)$ the deblocking filtering unit 130 sets input pixel values to be q2, q1, q0, p0, and p1 with respect to q0 nearest to the filtering boundary, and generates q0' filtered by using a 5-tap filter having a filter tap coefficient of {1,2,2,2,1}.

With respect to q1 nearest to the filtering boundary after q0, the deblocking filtering unit 130 sets input pixel values to be q2, q1, q0, and p1, and generates q1' filtered by using a 4-tap filter having a filter tap coefficient of {1,1,1,1}.

With respect to q2 nearest to the filtering boundary after q1, the deblocking filtering unit 130 sets input pixel values to be q3, q2, q1, q0, and p0, and generates q2' filtered by using a 5-tap filter having a filter tap coefficient of {2, 3, 1, 1, 1}.

The deblocking filtering unit 230 of the video decoding apparatus 200 according to an exemplary embodiment determines a filtering boundary to which deblocking filtering is to be performed from boundaries of at least one data unit from among coding units according to a tree structure, prediction units, and transformation units, determines filtering strength in the filtering boundary based on a prediction mode of coding units to which adjacent pixels belong based on the filtering boundary and transformation coefficient values of pixels adjacent to the filtering boundary, and performs deblocking filtering on decoded image data based on the filtering strength, by using information about deblocking filtering parsed from a bitstream. Since operations of the deblocking filtering unit 230 of the video decoding apparatus 200 are similar to those of the deblocking filtering unit 120 of the video encoding apparatus 100, detailed descriptions thereof will not be repeated.

Figure 23:
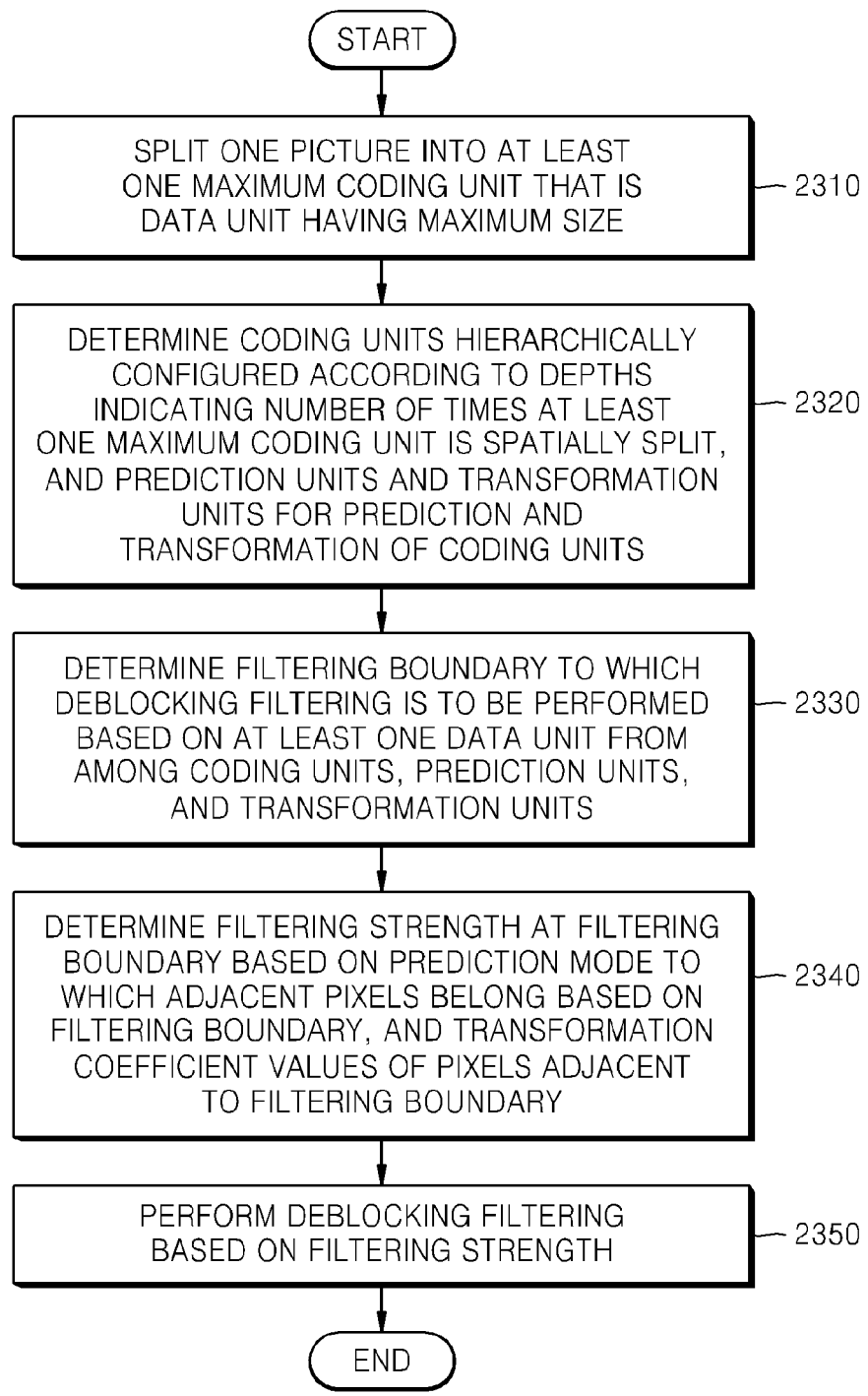
FIG. 23 is a flowchart illustrating a method of encoding a video based on coding units, according to an exemplary embodiment.

FIG. 23 is a flowchart illustrating a method of encoding a video based on coding units, according to an exemplary embodiment.

Referring to FIG. 23, in operation 2310, the coding unit determiner 110 splits one picture into at least one maximum coding unit that is a data unit having a maximum size. Then, in operation 2320, the coding unit determiner 110 determines coding units that are hierarchically configured according to depths indicating a number of times the at least one maximum coding unit is spatially spilt, and prediction units and transformation units respectively for prediction and transformation of the coding units.

In operation 2330, the deblocking filtering unit 130 determines a filtering boundary on which deblocking filtering is to be performed based on at least one data unit from among the coding units, prediction units, and the transformation units. As described above, the filtering boundary may be determined based on a boundary of data units having a predetermined size or above.

The deblocking filtering unit 130 determines filtering strength at the filtering boundary based on a prediction mode of a coding unit to which adjacent pixels belong based on the filtering boundary, and transformation coefficient values of pixels adjacent to the filtering boundary in operation 2340, and performs deblocking filtering based on the determined filtering strength in operation 2350.

Figure 24:
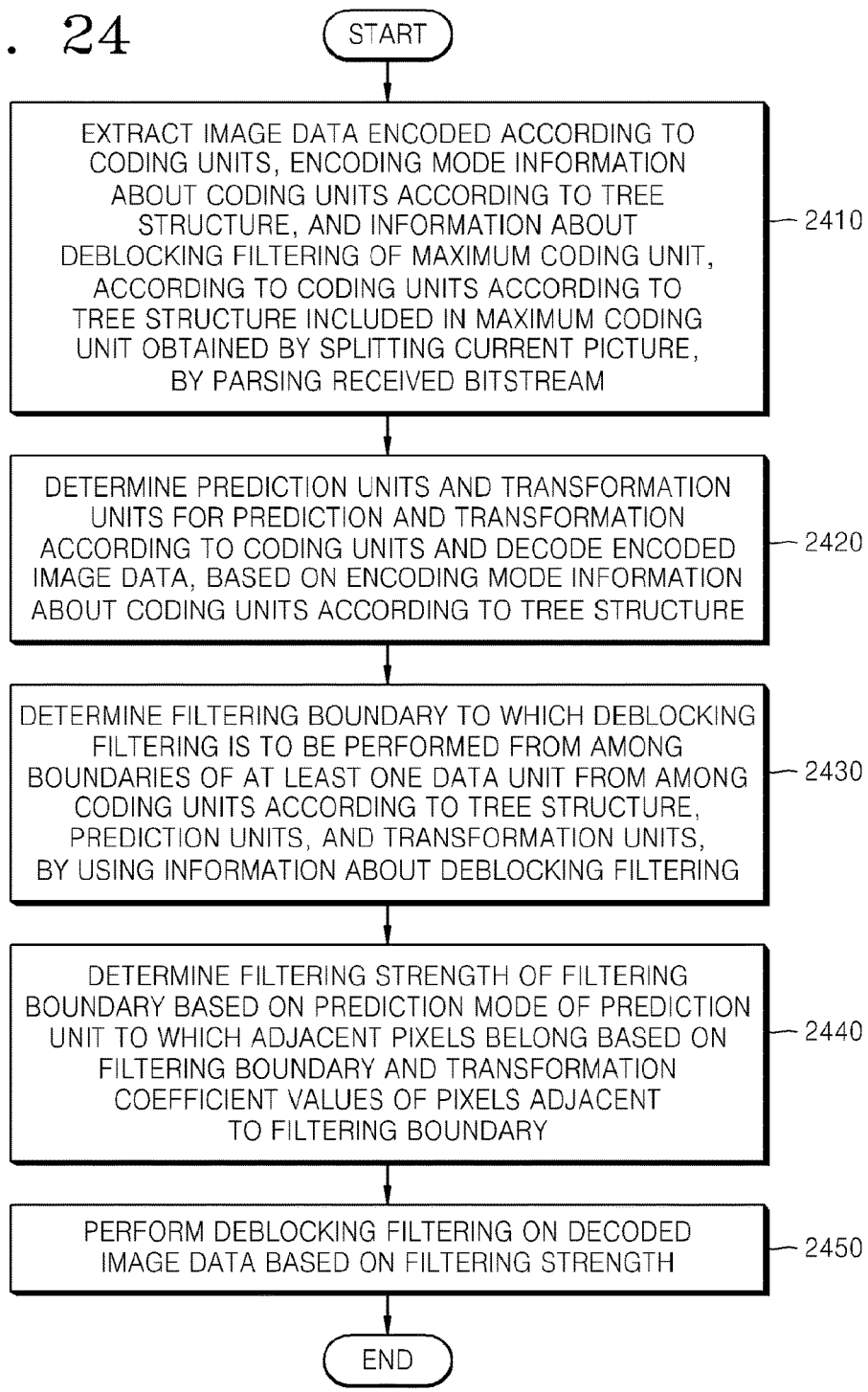
FIG. 24 is a flowchart illustrating a method of decoding a video based on coding units, according to an exemplary embodiment.

FIG. 24 is a flowchart illustrating a method of decoding a video based on coding units, according to an exemplary embodiment.

Referring to FIG. 24, in operation 2410, the receiving and extracting unit 210 extracts image data encoded according to coding units, encoding mode information about coding units according to a tree structure, and information about deblocking filtering in a maximum coding unit, according to the coding units according to the tree structure included in each maximum coding unit obtained by splitting a current picture, by parsing a received bitstream.

In operation 2420, the decoder 220 determines prediction units and transformation units for prediction and transformation according to the coding units and decodes the encoded image data, based on the encoding mode information about the coding units according to the tree structure.

In operation 2430, the deblocking filtering unit 230 determines a filtering boundary to which deblocking filtering is to be performed from among boundaries of at least one data unit from among the coding units according to the tree structure, the prediction units, and the transformation units, by using the information about the deblocking filtering.

In operation 2440, the deblocking filtering unit 230 determines filtering strength of the filtering boundary based on a prediction mode of a coding unit to which adjacent pixels based on the determined filtering boundary belong and transformation coefficient values of pixels adjacent to the filtering boundary.

In operation 2450, the deblocking filtering unit 230 performs deblocking filtering on the decoded image data based on the determined filtering strength.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While the exemplary embodiments has been particularly shown and described, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation.

The invention claimed is:

1. A method of decoding a video, which performs deblocking filtering based on coding units, the method comprising:
receiving a bitstream including data of a picture, information about a size of a maximum coding unit, and split information;
splitting the picture into a plurality of maximum coding units using the information about the size of the maximum coding unit;
hierarchically splitting a maximum coding unit among the plurality of maximum coding units into one or more coding units based on the split information;
determining one or more prediction units in a coding unit among the one or more coding units using partition type information, wherein the partition type information indicates one of a symmetric type and an asymmetric type;
determining one or more transform units in the coding unit using size information of a transform unit, wherein the transform unit is rectangular with a horizontal size and a vertical size indicated by the size information;
performing prediction on the prediction unit in the coding unit and inverse-transformation on the transform unit in the coding unit, in order to generate a reconstructed coding unit;
when a boundary included in the reconstructed coding unit corresponds to at least one of a boundary of the prediction unit and a boundary of the transform unit, determining a boundary strength for the boundary based on non-zero transformation coefficients, prediction mode, a motion vector, and a reference index;
determining a deblocking filtering method including a number of filter-taps and a location of pixels to be deblocking-filtered, based on the boundary strength and neighboring pixels adjacent to the boundary; and
performing deblocking filtering of pixels according to the deblocking filtering method, in order to generate a filtered coding unit including the deblocking-filtered pixels,
wherein when the split information indicates a split for a current depth, a coding unit of a current depth is split into the coding units of a lower depth, independently from neighboring coding units,
wherein the motion vector is used for inter prediction of a prediction unit to which pixels adjacent to the boundary belong, and the motion vector is used to determine the boundary strength when a prediction mode of the coding unit to which the pixels adjacent to the boundary belong is an inter mode, and wherein the deblocking filtering is performed according to the deblocking filtering method when the boundary is not a boundary of the picture.

2. A method of encoding a video, which performs deblocking filtering based on coding units, the method comprising:

generating information about a size of a maximum coding unit, wherein a picture is split into a plurality of maximum coding units based on the size of the maximum coding unit;

hierarchically splitting a maximum coding unit among the plurality of maximum coding units into one or more coding units;

generating first split information regarding the split of the maximum coding unit into the one or more coding units;

determining one or more prediction units in a coding unit among the one or more coding units;

performing prediction on the prediction unit;

generating partition type information for the prediction unit, wherein the partition type information indicates one of a symmetric type and an asymmetric type;

determining one or more transform units in the coding unit;

generating second split information regarding a split of the coding unit into the transform unit;

generating quantized transformation coefficients of the transform unit;

performing inverse-quantization and inverse-transformation on the quantized transformation coefficients, in order to generate reconstructed coding unit;

when a boundary included in the reconstructed coding unit corresponds to at least one of a boundary of the prediction unit and a boundary of the transform unit, determining a boundary strength for the boundary based on non-zero transformation coefficients, prediction mode, a motion vector, and a reference index;

determining a deblocking filtering method including a number of filter-taps and a location of pixels to be deblocking-filtered, based on the boundary strength and neighboring pixels adjacent to the boundary; and performing deblocking filtering of pixels according to the deblocking filtering method, in order to generate a filtered coding unit including the deblocking-filtered pixels, wherein when a coding unit of a current depth is split into coding units of a lower depth, independently from neighboring coding units, the first split information is generated for indicating a split for the current depth, wherein the motion vector is used for inter prediction of a prediction unit to which pixels adjacent to the boundary belong, and the motion vector is used to determine the boundary strength when a prediction mode of the coding unit to which the pixels adjacent to the boundary belong is an inter mode, and wherein the deblocking filtering is performed according to the deblocking filtering method when the boundary is not a boundary of the picture.

3. A non-transitory computer-readable medium for recording a bitstream, the bitstream comprising:

information about a size of a maximum coding unit to be split from a picture;

first split information for splitting hierarchically the maximum coding unit into one or more coding units;

partition type information for one or more prediction units determined in a coding unit among the one or more coding units, wherein the partition type information indicates one of a symmetric type and an asymmetric type;

second split information for splitting the coding unit into one or more transform units; and encoded data generated based on a filter coding unit, wherein the filtered coding unit is generated by:

performing prediction on the prediction unit in the coding unit and inverse-transformation on the transform unit in the coding unit, in order to generate a reconstructed coding unit;

when a boundary included in the reconstructed coding unit corresponds to at least one of a boundary of the prediction unit and a boundary of the transform unit, determining a boundary strength for the boundary based on non-zero transformation coefficients, prediction mode, a motion vector, and a reference index;

determining a deblocking filtering method including a number of filter-taps and a location of pixels to be deblocking-filtered, based on the boundary strength and neighboring pixels adjacent to the boundary; and performing deblocking filtering of pixels according to the deblocking filtering method, in order to generate the filtered coding unit including the deblocking-filtered pixels, wherein when a coding unit of a current depth is split into coding units of a lower depth, independently from neighboring coding units, the first split information is generated for indicating a split for the current depth, wherein the motion vector is used for inter prediction of a prediction unit to which pixels adjacent to the boundary belong, and the motion vector is used to determine the boundary strength when a prediction mode of the coding unit to which the pixels adjacent to the boundary belong is an inter mode, and wherein the deblocking filtering is performed according to the deblocking filtering method when the boundary is not a boundary of the picture.

4. An apparatus configured to encode a video, which performs deblocking filtering based on coding units, the apparatus comprising:

an encoder configured to:

generate information about a size of a maximum coding unit, wherein a picture is split into a plurality of maximum coding units based on the size of the maximum coding unit;

hierarchically slit a maximum coding unit among the plurality of maximum coding units into one or more coding units;

generate first split information regarding the split of the maximum coding unit into the one or more coding units;

determine one or more prediction units in a coding unit among the one or more coding units;

perform prediction on the prediction unit;

generate partition type information for the prediction unit, wherein the partition type information indicates one of a symmetric type and an asymmetric type;

determine one or more transform units in the coding unit;

generating second split information regarding a split of the coding unit into the transform unit;

generate quantized transformation coefficients of the transform unit;

perform inverse-quantization and inverse-transformation on the quantized transformation coefficients, in order to generate reconstructed coding unit;

when a boundary included in the reconstructed coding unit corresponds to at least one of a boundary of the prediction unit and a boundary of the transform unit, determine a boundary strength for the boundary based on non-zero transformation coefficients, prediction mode, a motion vector, and a reference index;

determine a deblocking filtering method including a number of filter-taps and a location of pixels to be deblocking-filtered, based on the boundary strength and neighboring pixels adjacent to the boundary; and perform deblocking filtering of pixels according to the deblocking filtering method, in order to generate a filtered coding unit including the deblocking-filtered pixels, wherein when a coding unit of a current depth is split into coding units of a lower depth, independently from neighboring coding units, the split information is generated for indicating a split for the current depth, wherein the motion vector is used for inter prediction of a prediction unit to which pixels adjacent to the boundary belong, and the motion vector is used to determine the boundary strength when a prediction mode of the coding unit to which the pixels adjacent to the boundary belong is an inter mode, and wherein the deblocking filtering is performed according to the deblocking filtering method when the boundary is not a boundary of the picture.

* * * * *